(12) United States Patent
Hayakawa

(10) Patent No.: US 8,814,627 B2
(45) Date of Patent: Aug. 26, 2014

(54) TOY SET, GAME CONTROL PROGRAM, AND GAME DEVICE AND TOY COMMUNICATION SYSTEM

(75) Inventor: Tetsuya Hayakawa, Tokyo (JP)

(73) Assignee: Sega Toys Co., Ltd., Tokyo (JP)

( * ) Notice: Subject to any disclaimer, the term of this patent is extended or adjusted under 35 U.S.C. 154(b) by 280 days.

(21) Appl. No.: 13/575,634

(22) PCT Filed: Jan. 28, 2011

(86) PCT No.: PCT/JP2011/052303
§ 371 (c)(1),
(2), (4) Date: Aug. 22, 2012

(87) PCT Pub. No.: WO2011/093525
PCT Pub. Date: Aug. 4, 2011

(65) Prior Publication Data
US 2012/0315821 A1    Dec. 13, 2012

(30) Foreign Application Priority Data

Jan. 29, 2010 (JP) ................................. 2010-017528
Jul. 23, 2010 (JP) ................................. 2010-165859

(51) Int. Cl.
| | | |
|---|---|---|
| *A63F 13/00* | (2014.01) | |
| *A63F 13/12* | (2006.01) | |
| *G06N 3/00* | (2006.01) | |
| *A63H 3/28* | (2006.01) | |
| *A63F 13/02* | (2006.01) | |

(52) U.S. Cl.
CPC ......... *A63F 13/02* (2013.01); *A63F 2300/6081* (2013.01); *A63F 2300/1081* (2013.01); *A63F 2300/6072* (2013.01); *A63F 13/12* (2013.01); *A63H 2200/00* (2013.01); *G06N 3/008* (2013.01); *A63H 3/28* (2013.01)
USPC ................ 446/297; 446/172; 446/484; 463/1

(58) Field of Classification Search
CPC . A63F 13/02; A63F 13/12; A63F 2300/6081; G06N 3/008; A63H 3/28
See application file for complete search history.

(56) References Cited

U.S. PATENT DOCUMENTS

| | | | |
|---|---|---|---|
| 2011/0034251 A1* | 2/2011 | Cohen et al. ..................... | 463/39 |
| 2011/0082573 A1* | 4/2011 | Hiraishi et al. .................. | 700/94 |
| 2012/0058705 A1* | 3/2012 | Atsmon et al. ................ | 446/175 |

(Continued)

FOREIGN PATENT DOCUMENTS

| | | |
|---|---|---|
| JP | 2002-536031 A | 10/2002 |
| JP | 2003-19364 A | 1/2003 |

(Continued)

OTHER PUBLICATIONS

International Search Report dated Apr. 11, 2011, issued in International application No. PCT/JP2011/052303, mailed on Apr. 19, 2011.

*Primary Examiner* — William Brewster
*Assistant Examiner* — Alex F.R.P Rada, II
(74) *Attorney, Agent, or Firm* — The Marbury Law Group, PLLC

(57) ABSTRACT

A toy set that enables communication between a game device and a toy without changing a hardware configuration of the game device includes a program stored in a storage medium that when executed causes the game device to detect a sequence of single frequency sounds, output a voice corresponding to a combination of the detected sounds, generate a plurality of single frequency sound and generate a control signal by a combination of the sounds. The toy incorporates a sound generation means, a voice input means, a control means and a sensing means. The control means includes a generation means for generating a control signal as a sequence of plurality of single frequency sounds sent out from the sound generation means of the toy. When the control signal is inputted from the game device, the toy performs a predetermined action which corresponds to the control signal.

16 Claims, 8 Drawing Sheets

(56) References Cited

U.S. PATENT DOCUMENTS

2012/0150352 A1* 6/2012 Park .............................. 700/264
2013/0244531 A1* 9/2013 Atsmon et al. ................ 446/175

FOREIGN PATENT DOCUMENTS

JP  2008-228746 A  10/2008
JP  2008-259573 A  10/2008

* cited by examiner

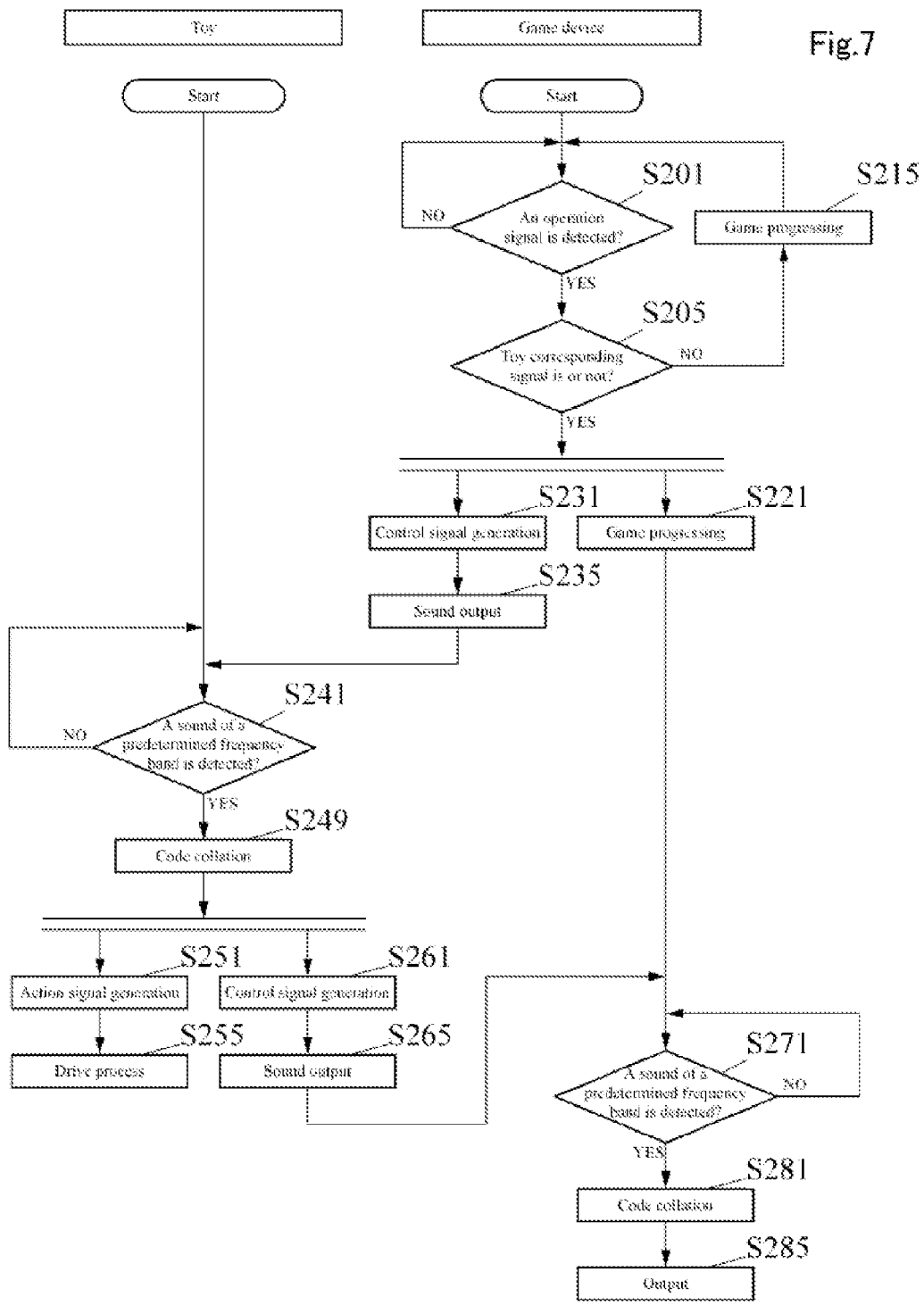

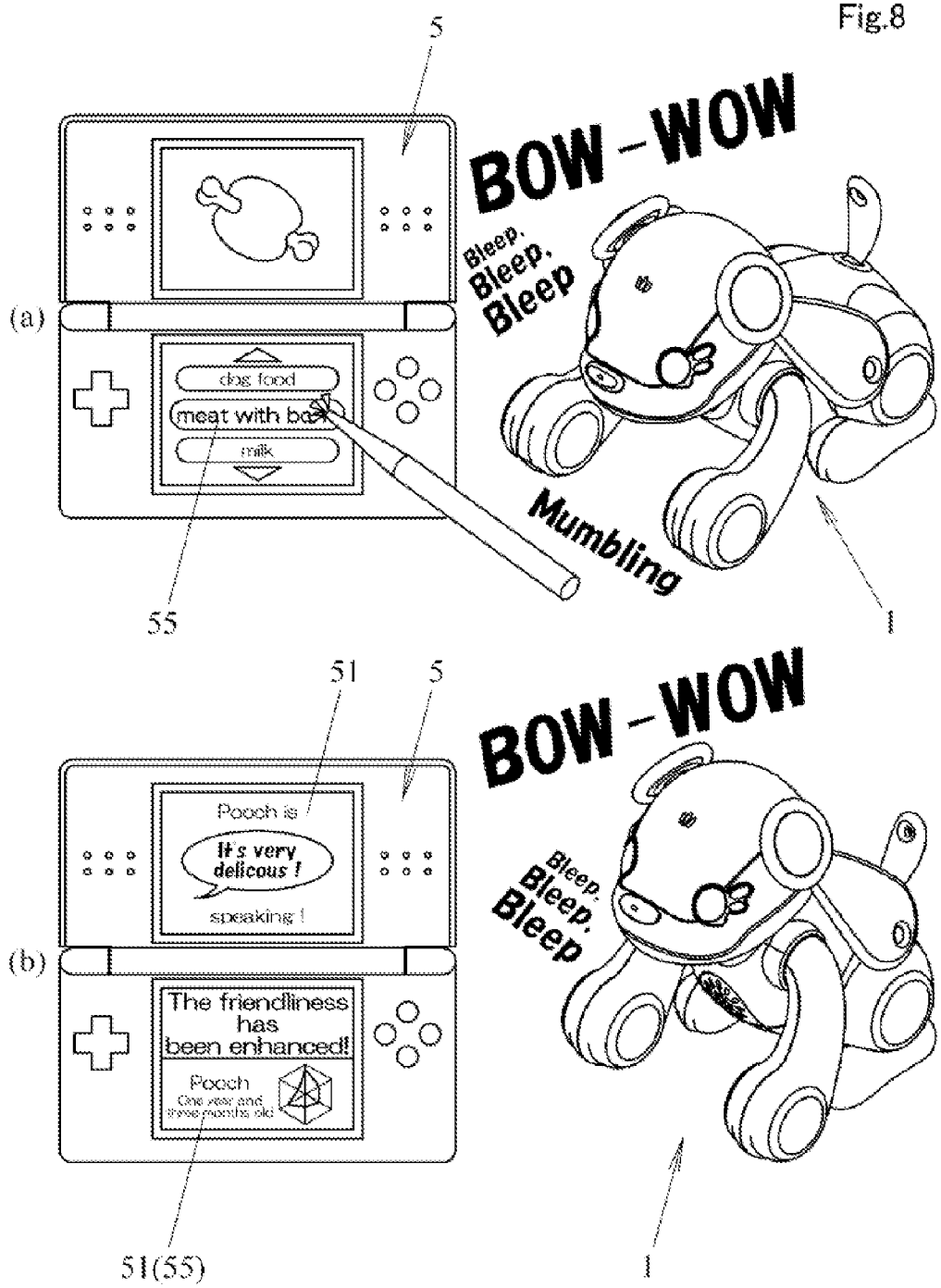

ns and, furthermore, it has been difficult to develop application software (game software) which enables the utilization of an additional character toy which cooperates in a wireless fashion between the game device and the toy.

The invention has been made in view of the problem that is inherent in the related art, and an object of the invention is to provide a toy set which enables a wireless communication between a game device, in particular, a portable game device and a toy without making any hardware change or installing additionally a new hardware interface in the portable game device, a game control program which enables the communication and a communication system for use between the game device and the toy.

Means for Solving the Problem

According to the invention, there is provided a toy set having, in combination with a program, a toy which operates in cooperation with an electronic device such as a game device which is adapted to control a game, characterized in that (a) the program is a first program which is read into the electronic device so as to be executed by a control means of the electronic device, the first program including a plurality of individual programs and data which generates images including a character which corresponds to an external shape of the toy and sound and imparting the following functions to the electronic device when executed by the control means of the electronic device:

a filter function to detect individually sounds of a single frequency which are inputted into a sound input means of the electronic device; a function to read out an individual program which corresponds to a combination of sounds of a single frequency that are detected by the filter function and which are arranged in a time series fashion so as to output at least either of an image and a sound; a function to generate a plurality of sounds of a single frequency which are different from each other; a function to generate a control signal by the combination of the sounds of a single frequency; and a function to arrange a plurality of the sounds of a single frequency, which make up the control signal so generated, in a time series fashion and to send out sequentially the sounds of a single frequency which are arranged in the time series fashion from a sound generation means of the electronic device while superposing the sounds of a single frequency on a sound which is outputted in cooperation with an image which is displayed on a display screen of a display means of the electronic device or immediately before the sound is outputted, in that (b) the toy is a character toy which comprises a sound generation means for outputting a sound of a voice band which is inputted into the sound input means equipped in the electronic device, a sound input means into which a sound of a voice band which is outputted from a sound generation means equipped in the electronic device is inputted, a toy-mounted control means, a sensing means for sensing a touching action by a user, a means for generating a sound, a storage means in which a second program including a plurality of individual programs is stored, and a means for generating a plurality of sounds of a single frequency which are different from each other, in that when executed by the toy-mounted control means, the second program which is stored in the storage means allows the toy to be configured so as to equip the following functions: a function to generate a control signal by combining the sounds of a single frequency; a function to arrange a plurality of the sounds of a single frequency which make up the control signal generated in a time series

TOY SET, GAME CONTROL PROGRAM, AND GAME DEVICE AND TOY COMMUNICATION SYSTEM

TECHNICAL FIELD

The present invention relates to a game control program that is incorporated in a game device and a toy set which is a combination of a toy which operates in cooperation with the game device which executes the game control program and the game control program that is incorporated in the game device and relates further to an inter-electronic-device communication system employing a voice band for use between the game device which has executed the game control program and the toy.

BACKGROUND ART

Conventionally, there are known many character toys which are mimic pets which express their own emotional feelings by sensing a touching action performed by their users. Additionally, there are also known character toys which operate based on a signal from a game device or devices which translate a crying voice radiated from a stylized toy having an external appearance of a character.

As a character toy which operates based on a signal from a game device, Japanese Unexamined Patent Application No. 2008-228746 (Patent Literature 1) proposes a voice output toy which outputs specific voices by receiving at the toy a control signal from a game device which is designed to send out control signals which are set in advance as a game progresses and selecting one piece of voice information from a plurality of pieces of voice information which are stored in advance in the toy.

Additionally, as a device which translates a crying voice that is radiated from a stylized toy, for example, Japanese Unexamined Patent Application No. 2002-311984 (Patent Literature 2) proposes a conversation device which recognizes a voice (a crying voice) that is outputted from a character toy such as a pet robot to display information in the form of a character string which corresponds to the voice recognized on a liquid crystal display device, that is, which operates as if translating a crying voice of the pet robot.

RELATED ART LITERATURE

Patent Literature

Patent Literature 1: Japanese Unexamined Patent Application No. 2008-228746
Patent Literature 2: Japanese Unexamined Patent Application No. 2002-311984

SUMMARY OF THE INVENTION

Problem that the Invention is to Solve

In the inventions that are described in Patent Literatures described above, an exclusive electric or optical interface is equipped in advance in the game deice and the character toy, and a communication between the game device and the character toy can be executed without any difficulty. However, as in a portable game device which enables the execution of a game control program that is recorded in a storage medium by loading the storage medium in the game device, an interface that is equipped in advance in the game device has a certain restriction, and in an environment where the addition or alterfashion and to send out sequentially the sounds of a single frequency which are arranged in the time series fashion from the sound generation means of the toy while superposing the sounds of a single frequency on a sound which is outputted from the sound generation means of the toy or immediately before the sound is outputted from the sound generation means of the toy; a function to output a voice in response to an operation by the user; and a function to control, when the sounds of a single frequency that are sent out while being superposed on the sound which is outputted from the sound generation means of the electronic device or immediately before the sound is outputted and that are arranged in the time series fashion are inputted into the sound input means of the toy, so that an individual program which corresponds to a combination of the sounds of a single frequency so inputted is read out from the storage means of the toy so as to output a sound or to perform a predetermined action, and in that by the toy set being made up of the first program and the character-shaped toy, a mutual communication between the electronic device and the toy is enabled by making use of the sound input means and the sound generation means which are equipped in the electronic device without making any additional change to a hardware configuration of the electronic device.

Additionally, according to the invention, there is provided a toy set, characterized by comprising: (a) a storage medium including a connecting module with a connecting specification which corresponds to an interface of a game device, a storage module and a first program that is stored in the storage module and which is adapted to be read into the game device for execution by a control means of the game device, the first program including a plurality of individual programs and data which generates images including an image of a character which is embodied by an external shape of the toy and voice and imparting the following functions to the game device when read in from the interface and executed by the control means of the game device: a filter function to detect individually sounds of a single frequency which are inputted into a voice input means of the game device; a function to read out an individual program which corresponds to a combination of sounds of a single frequency that are detected by the filter function and that are arranged in a time series fashion so as to output at least either of an image and a sound; a function to generate a plurality of sounds of a single frequency which are different from each other; a function to generate a control signal by the combination of the sounds of a single frequency; a function to arrange a plurality of the sounds of a single frequency which make up the control signal so generated in a time series fashion and to send out sequentially the sounds of a single frequency which are arranged in the time series fashion from a sound generation means of the toy while superposing the sounds of a single frequency on a voice which is outputted in cooperation with an image which is displayed on a display screen of a display means of the game device or immediately before the voice is outputted; and (b) a toy having the shape of a character and comprising a sound generation means for outputting a sound of a voice band which is inputted into the voice input means equipped in the game device, a voice input means into which a sound of a voice band which is outputted from the sound generation means equipped in the game device is inputted, a toy-mounted control means, a sensing means for sensing a touching action by a user, a means for generating a voice, a storage means in which a second program including a plurality of individual programs is stored, and a means for generating a plurality of sounds of a single frequency which are different from each other, when executed by the toy-mounted control means, the second program allowing the toy to be configured so as to equip the following functions: a function to generate a control signal by combining the sounds of a single frequency; a function to arrange a plurality of the sounds of a single frequency which make up the control signal generated in a time series fashion and to send out sequentially the sounds of a single frequency which are arranged in the time series fashion from the sound generation means of the toy while superposing the sounds of a single frequency on a voice which is outputted from the sound generation means of the toy or immediately before the voice is outputted from the sound generation means of the toy; a function to output a voice in response to an operation by the user; and a function to control, when the sounds of a single frequency that are sent out while being superposed on the voice which is outputted from the sound generation means of the game device or immediately before the voice is outputted and which are arranged in the time series fashion are inputted into the voice input means of the toy, so that an individual program which corresponds to a combination of the sounds of a single frequency so inputted is read out from the storage means of the toy so as to output a voice or to perform a predetermined action, and characterized in that a mutual communication between the game device and the toy is enabled by making use of the voice input means and the sound generation means which are equipped in the game device without making any additional change to a hardware configuration of the game device.

In addition, it is preferable that an external shape of the toy imitates a dog and that data which generates a voice which is a crying voice of the dog is stored in the storage means of the toy.

Further, the individual program that is executed by the control means of the game device or the like can include data which controls so that a voice including words which correspond to the crying voice of the dog which is outputted from the toy is outputted from the sound generation means of the game device.

In addition, when the control signal from the toy is configured so as to be sent out immediately before a sound is generated to be radiated from the sound generation means, the individual program that is executed by the control means of the game device or the like can control so that words which correspond to the control signal are displayed on the display screen of the display means of the game device in synchronism with a voice that is outputted immediately after the control signal.

Additionally, it is preferable that sounds of a single frequency that are different from each other and which are sent out from the toy are selected individually from a frequency band of 2000 to 3000 Hz, and a plurality of the sounds of a single frequency are sent out at intervals while being arranged in a time series fashion.

Further, it is preferable that the sounds of a single frequency that are different from each other and which are sent out from the toy are made up of a first sound which is selected from 3000 to 2900 Hz, a second sound which is selected from 2800 to 2700 Hz, a third sound which is selected from 2700 to 2600 Hz, a fourth sound which is selected from 2500 to 2400 Hz, and a fifth sound which is selected from 2400 to 2300 Hz and that the control signal is made up of a combination of the sounds which are selected out of the first sound to the fifth sound.

Furthermore, it is preferable that sounds of a single frequency that are different from each other, which are generated by execution of the first program which is included in the toy set and which are sent out from the voice generation means of the game device are selected from a frequency band of 7000 to 9000 Hz and that a plurality of the sounds of a single frequency are sent out at intervals while being arranged in a time series fashion.

Additionally, according to the invention, there is provided a game control program characterized by including a plurality of individual programs and data which generates an image and a sound and by making, when read into a game device to thereby be executed by a control means of the game device, the game device execute a process which includes: a sound detection process for detecting individually sounds of a single frequency which are inputted into a sound input means of the game device while being arranged in a time series fashion; an output process for reading out an individual program which is designated by a combination of the sounds of a single frequency that are detected in the sound detection process and which are arranged in the time series fashion so as to output at least either of an image and a sound; a process for generating a control signal which designates any of the individual programs by a combination of a plurality of the sounds of a single frequency; and a sound output process for arranging the plurality of the sounds of a single frequency which make up the control signal so generated in a time series fashion and sending out sequentially the sounds of a single frequency which are arranged in the time series fashion from a sound generation means of the game device while superposing the sounds of a single frequency which are arranged in the time series fashion on a sound which is output in relation to an image displayed on a display screen of a display means of the game device or immediately before the sound is outputted, thereby enabling a mutual communication with the toy which operates in cooperation with the game device by making use of the sound input means and the sound generation means which are equipped in the game device without making any additional change to a hardware configuration of the game device.

According to the invention, there is further provided a game control program stored in a storage medium comprising a connecting module with a connecting specification which corresponds to an interface of a game device and adapted to be executed by a control means of the game device, characterized by including a plurality of individual programs and data which generates an image and a sound and by making, when the storage medium is mounted in the interface and the program is read into the game device to thereby be executed by the control means of the game device, the game device execute a process which includes: a sound detection process for detecting individually sounds of a single frequency which are inputted into a sound input means of the game device while being arranged in a time series fashion; an output process for reading out an individual program which is designated by a combination of the sounds of a single frequency that are detected in the sound detection process and which are arranged in the time series fashion so as to output at least either of an image and a sound; a process for generating a control signal which designates any of the individual programs by a combination of a plurality of the sounds of a single frequency; and a sound output process for arranging the plurality of the sounds of a single frequency which make up the control signal so generated in a time series fashion and sending out sequentially the sounds of a single frequency which are arranged in the time series fashion from a sound generation means of the game device while superposing the sounds of a single frequency which are arranged in the time series fashion on a sound which is output in relation to an image displayed on a display screen of a display means of the game device or immediately before the sound is outputted.

Additionally, this game control program can be a program which executes an output process for outputting a voice which includes words which correspond to a sound which is outputted from the toy from the sound generation means of the game device.

In addition, this game control program can execute an output process for displaying words which correspond to a control signal which is sent out from the toy on the display screen of the display means of the game device in synchronism with a sound which is outputted immediately after the control signal.

In addition, according to the invention, there is provided a transmission/reception system between electronic devises, characterized in that each of the electronic devices comprises a sound generation means for outputting a sound of a voice band, a sound input means into which a sound of a voice band is inputted, a read means for reading out a computer program which includes a plurality of individual programs and a control means for controlling the execution of the computer program, and in that in each of the electronic devices, when the computer program is read out and is executed by the control means, the computer program makes the electronic device include: a function to generate a control signal by combining the sounds of a single frequency; a function to arrange a plurality of the sounds of a single frequency which make up the control signal so generated in a time series fashion so as to send out sequentially the plurality of the sounds of a single frequency which are arranged in the time series fashion from the sound generation means of the toy to the mating electronic device; a function to read out, when sounds of a single frequency that are arranged in a time series fashion and which are transmitted from the mating electronic device are received at the sound input means, an individual program which corresponds to a control signal which is made up of the sounds of a single frequency which are so arranged; and a function to execute the individual program which is so read out by the control means, thereby enabling a mutual communication between the electronic devices by making use of the sound input means and the sound generation means which are possessed by each of the electronic devices.

Advantage of the Invention

According to the invention, the filter which detects the control signal which is included in the sounds which are inputted into the voice input means by making use of the sound of the voice band which is inputted into the voice input means and the sound of the voice band which is radiated by the sound generation means which are equipped in the game device as the transmission/reception means (that is, the communication means) is realized by the software by executing the program which is read into the game device, and therefore, the communication of the control signal between the game device and the character toy can be realized while maintaining the hardware configuration of the existing game device without adding any software to the existing game device.

In addition, the individual sounds which make up the control signal are the sounds of a single frequency, and the sounds of a single frequency are transmitted individually one by one (one by one at intervals of the predetermined length of time), while the sounds of the specific single frequency are detected individually one by one out of the crying voice or the game sound received on the reception side. Therefore, the configuration of the toy set can be made simple.

Further, the program provided in the game device is made up of the plurality of unit programs, that is, a group of programs which can be executed individually, and the individual program that is to be executed is read out by being designated by the simple control signal which is made up of the sounds of a single frequency which are arranged in the time series fashion. Therefore, the configuration of the transmission/reception system of the control signal can be made simple.

In addition, the communication utilizing the voice band between the game device and the toy is implemented in such an environment that is surrounded by much noise including voices of the user child and his or her friends which operate the game device and the toy and the family members. However, since the sounds of a single frequency are detected sequentially and individually, even in the environment where there is much noise in the voice band, the system which enables the detection of the specific sounds without adding any exclusive hardware to the game device can be realized with the simple program. The code is made up of the combination of the sounds which are detected in this way or the combination of the five sounds, for example, and the predetermined data is selected from the data which generates the images including the character which represents the external appearance of the toy and the voices (crying voice, words and BGM) using the code as the address. Therefore, data of many kinds of images, crying voices and voices are stored in advance in the storage medium, thereby making it possible to provide a wide variety of plays.

BRIEF DESCRIPTION OF THE DRAWINGS

FIG. 7 is a flowchart depicting a control flow of the game device and the toy in a game device operation mode according to the embodiment of the invention.

FIG. 8 shows diagrams depicting examples of operations of the toy set when in the game device operation mode according to the embodiment of the invention.

DESCRIPTION OF REFERENCE NUMERALS

1 Toy; 5 Game device; 8 Storage medium; 11 LED; 11a Light source control circuit; 12 Loudspeaker; 12a Sound generation circuit; 13 Microphone; 13a Sound detection circuit; 15 Touch sensor; 16 Push sensor; 17 ROM; 18 RAM; 19 Motor; 19a Motor drive circuit; 20 CPU; 21 Light source control means; 22a Voice generation means; 22b Single sound generation means; 23 Filter means; 29 Motor control means; 51 Display means; 51a Display drive circuit; 52 Loudspeaker; 52a Sound generation circuit; 53 Microphone; 53a Sound detection circuit; 54 Storage medium mounting interface; 55 Operation input means; 57 ROM; 58 RAM; 60 CPU; 61 Display control means; 62a Voice generation means; 62b Single sound generation means; 63 Filter means; 100 Toy set; 101 Play sheet.

MODE FOR CARRYING OUT THE INVENTION

Figure 1:
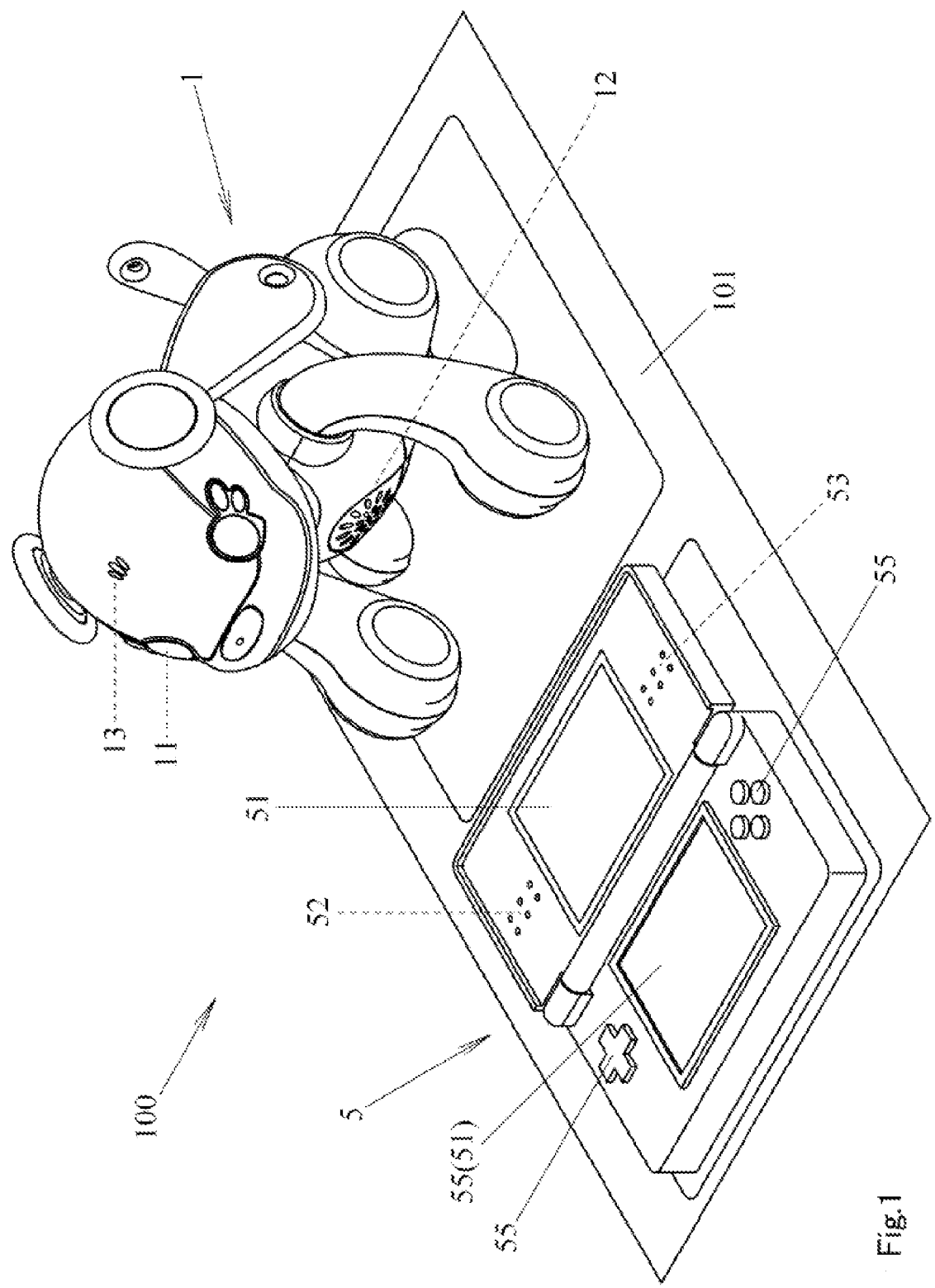
FIG. 1 is an external perspective view showing a toy set according to an embodiment of the invention.
Figure 2:
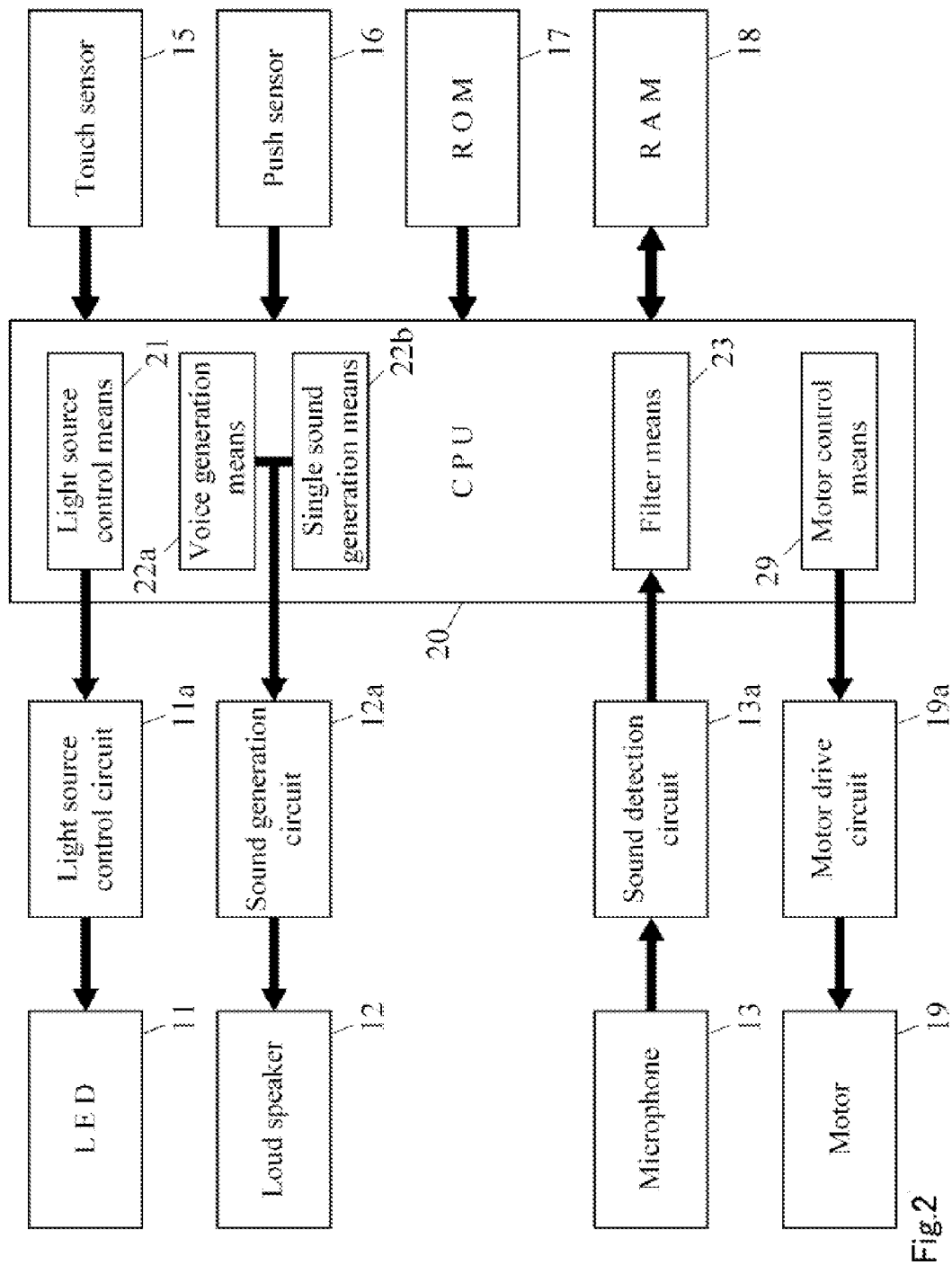
FIG. 2 is a functional circuitry block diagram of a toy according to the embodiment of the invention.
Figure 3:
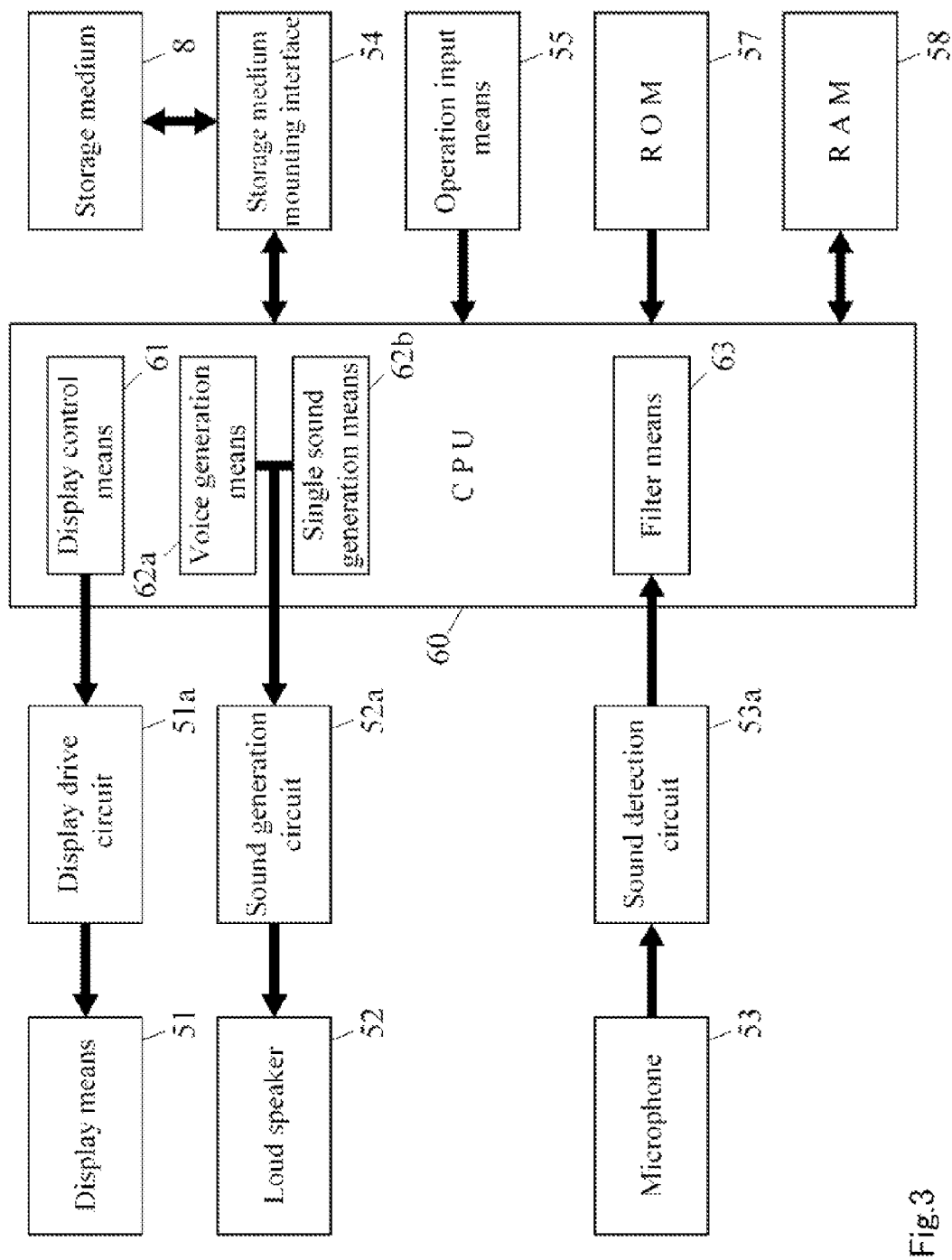
FIG. 3 is a functional circuitry block diagram of a game device according to the embodiment of the invention.

Hereinafter, an embodiment for carrying out the invention will be described. As shown in FIGS. 1 to 3, a toy set 100 has a toy 1 which can generate sound and a storage medium 8 which is detachably mounted in a game device 5. Additionally, there may be a situation in which the toy set 100 includes a play sheet by which a user can easily locate the toy 1 and the game device in positions which are appropriate for communication therebetween. Then, this toy set 100 enables a mutual communication by making use of a hardware configuration equipped in the game device 5 without making any additional change to the hardware configuration of the game device 5.

As shown in an external view of FIG. 1 and a functional circuitry block diagram of FIG. 3, the game device 5 which is used in the toy set 100 includes a display means 51 which is a liquid crystal display device, a loudspeaker 52 which is a sound generation means which outputs sound of a voice band, a microphone 53 as a voice input means for inputting sound of the voice band, an operation input means 55 which is operated by the user, a storage medium mounting interface 54 and a control means. The control means executes a program read from the storage medium 8 and includes a CPU 60, a ROM 57 which is a storage means and a RAM 58.

Then, the storage medium 8 which makes up the toy set 100 stores a game control program which is designed to be read into the game device 5 so as to be executed by the control means of the game device 5 and includes a connecting specification which corresponds to the storage medium mounting interface 54.

The program stored in this storage medium 8 enables a mutual communication with the toy 1 by making use of a hardware configuration equipped in the game device 5 without making any additional change to the hardware configuration equipped in the game device 5.

Additionally, this program includes a plurality of control programs and data which generates images including an image of the shape of a character of the toy 1 and voices. Further, when the storage medium 8 is mounted in the storage medium mounting interface 54 and the program is read into the game device 5 for execution by the control means of the game device 5, the program configures a filter means 63, an output means and a single sound generation means 62b in the game device 5. The configuration of these means can be realized by making the CPU 60 of the game device 5 execute functions of those means by a first program which is executed under the control of the CPU 60 of the game device 5.

The filter means 63 detects sounds of a single frequency which are inputted into the microphone 53 of the game device 5. Additionally, the output means reads out a control program which corresponds to a combination of the sounds of a single frequency which is detected by the filter means 63 and which are arranged in a time series fashion and outputs at least either of an image and a voice. Namely, the CPU 60 which functions as the output means executes a control to display a predetermined display image on the display means 51 of the game device 5 or to output a predetermined voice from the loudspeaker 52 of the game device 5. The single sound generation means 62b generates a plurality of sounds of a single frequency which are different from each other.

Further, when read into the game device 5 for execution by the control means of the game device 5, the program stored in the storage medium 8 not only generates a control signal which is made up by combining together sounds of a single frequency but also configures a sender means which arranges a plurality of the sounds of a single frequency which make up the control signal so generated in a time series fashion and sends out the sounds of a single frequency which are arranged in the time series fashion sequentially from the loudspeaker 52 of the game device 5 while superposing the plurality of the sounds of a single frequency on a voice (a game sound) which is outputted in relation to an image displayed on a display screen of the display means 51 of the game device 5 or immediately before the voice (the game sound) is outputted. The CPU 60 of the game device 5 can be made to execute the function of this sender means.

As shown in FIG. 1, the toy 1 has an external shape of a character which imitates a dog. Additionally, as shown in a functional block diagram of FIG. 2, this toy 1 incorporates a loudspeaker 12 which is a sound generation means which outputs sounds of a voice band which are inputted into the microphone 53 equipped in the game device 5, a microphone 13 which is a voice input means into which sounds of the voice band outputted from the loudspeaker 52 equipped in the game device 5 are inputted, a control means, and a touch sensor 15 and a push sensor 16 which are sensing means which sense a touching action made by the user. Additionally, this toy 1 is designed to perform a predetermined action or to output a voice in response to an operation by the user. In addition, this toy 1 is designed to send a control signal to the game device 5 in response to an operation by the user.

The control means of the toy 1 includes a CPU 20, a ROM 17 as a storage means which stores a plurality of control programs and a RAM 18 which functions as a working memory. The CPU 20 functions as a voice generation means 22a which generates a voice and a single sound generation means 22b which generates a plurality of sounds of a single frequency which are different from each other. Additionally, data which generates a voice which is a crying voice of a dog is stored in the ROM 17 which is the storage means.

In addition, the control means of the toy 1 generates a control signal by combining together sounds of a single frequency. Then, this control means is designed to arrange a plurality of the sounds of a single frequency which make up the control signal so generated in a time series fashion and to send out sequentially the plurality of the sounds of a single frequency which are arranged in the time series fashion (the control signal) from the loudspeaker 12 of the toy 1 immediately before the voice (the crying voice of the dog) is outputted from the loudspeaker 12 of the toy 1.

The toy 1 is controlled further by the CPU 20 so that the sounds of a single frequency arranged in the time series fashion which are sent out while being superposed on the voice (the game sound) that is outputted from the loudspeaker 52 of the game device 5 or immediately before the voice (the game sound) is outputted are inputted into the control means by the microphone 13 of the toy 1 so as to read out a control program which corresponds to the combination of the sounds of a single frequency which are so inputted from the ROM 17 which is the storage means of the toy 1 to thereby output a voice or to perform a predetermined action.

Consequently, the toy 1 can communicate mutually with the game device 5 by a second program which is stored in the RON 17 as a storage means of the toy 1 and which is a program or data which controls the action of the toy 1 by making use of a hardware configuration equipped in the game device 5 without making any additional change to the hardware configuration of the game device 5 along with the control by the first program.

In addition, the control program stored in the storage medium 8 controls so that words that correspond to a control signal from the toy 1 are displayed on the display means 51 of the game device 5 in synchronism with a voice (a crying voice of the dog) that is outputted immediately after the control signal.

Here, the sounds of a single frequency that are different from each other and which are sent out from the toy 1 are selected individually from a frequency band of 2000 to 3000 Hz. Additionally, a plurality of the sounds of a single frequency are arranged in a time series fashion and are sent out individually and sequentially at intervals of about 0.1 second over a length of time of about 0.05 second. In addition, the sounds of a single frequency that are different from each other and which are sent out by the sender means which is generated by the execution of the program read in from the storage medium 8 which makes up the toy set 100 are selected individually from a frequency band of 7000 to 9000 Hz. Similarly, a plurality of the sounds of a single frequency are arranged in the time series fashion and are sent out individually and sequentially at intervals of about 0.1 second over a length of time of about 0.05 second.

In addition, the sounds of a single frequency that are different from each other and which are outputted from the toy 1 are sounds of five kinds which include a first sound which is selected from 3000 to 2900 Hz, a second sound selected from 2800 to 2700 Hz, a third sound selected from 2700 to 2600 Hz, a fourth sound selected from 2500 to 2400 Hz, and a fifth sound selected from 2400 to 2300 Hz. In this embodiment, the control signal is formed by selecting three sounds out of five sounds including the first sound to the fifth sound (including a selection of the same sound) and combining them together. Similarly, the sounds of a single frequency that are different from each other and which are outputted from the game device 5 are also sounds of five kinds including a first sound to a fifth sound which are selected from the frequency band of 7000 to 9000 Hz, and the control signal is formed by selecting, for example, three sounds out of the five kinds and combining them together. Namely, the control signal is made up by combining sounds selected from the sounds within from the first sound to the fifth sound.

Embodiment

Hereinafter, an embodiment of the invention will be described based on the drawings. FIG. 1 is an external perspective view showing a toy set 100 according to the embodiment. As shown in the figure, the toy set 100 according to the embodiment includes a toy 1 that can generate a sound and which has an external shape of a character which imitates a dog and a storage medium 8 that is detachably mounted in a portable game device 5 (although not shown in FIG. 1, the storage medium is mounted in an interface which is formed on a lateral side of the game device). Additionally, there may be a situation in which the toy set 100 includes a play sheet 101 by which a user can locate the toy 1 and the game device 5 in positions which are appropriate for communication therebetween.

In addition, this toy set 100 enables a mutual communication by making use of the voice input means and the sound generation means which are equipped in the game device without making any additional change to a hardware configuration of the game device 5. Namely, in this toy set 100, by operating the game device 5, a control signal outputted from the game device 5 can be transmitted to the toy 1 so as to make the toy 1 perform a predetermined action, while by operating the toy 1, a control signal outputted from the toy 1 is transmitted to the game device 5 so as to make the game device 5 to perform a predetermined action.

The configurations of the game device 5 and the toy 1 which are used in the toy set 100 will be described by reference to FIGS. 1 to 3. FIGS. 2 and 3 are functional circuitry block diagrams of the toy 1 and the game device 5, respectively.

Firstly, the configuration of the toy 1 will be described by reference to FIGS. 1 and 2. The toy 1 is a stylized toy having an external shape of a character which imitates a dog. Additionally, this toy 1 includes LEDs 11 which are incorporated in eye portions, a loudspeaker 12 which is incorporated in a chest portion, a microphone 13 which is incorporated in a head portion, a touch sensor 15 which is incorporated in a back portion, and a push sensor 16 which is incorporated in a tail portion. In addition, this toy incorporates a CPU 20 which controls operations of the LEDs 11, the loudspeaker 12, the microphone 13, the touch sensor 15 and the push sensor 16.

In addition, this toy 1 is designed to generate a voice or to move in response to an operation by the user. Specifically, by being stroked on the back portion or touched at the tail portion, this toy 1 performs various actions such as lying down, tilting the head portion, causing the eyes to shine, and crying. The action of lying down is executed by driving motors which rotate arm portions about shoulders as fulcrums. Additionally, the action of tilting the head portion is executed by rotating a neck portion which is held rotatably through a predetermined angle by a motor. Further, this toy 1 can express a state of the character (the dog) by changing the color of part including eyes or the like of the body or the whole of the body by causing the LEDs 11 to emit light. Additionally, this toy 1 can generate a crying voice of the dog from the loudspeaker 12. Namely, this toy 1 can express an emotional feeling or a health state thereof by performing the various actions in response to the operations by the user. In addition, these actions are also performed by control signals from the game device 5, which will be described later.

As shown in FIG. 2, the control means of the toy 1 has the CPU 20, a ROM 17 as a storage means which is connected to the CPU 20 and a RAM 18. The ROM 17 is the storage means where a plurality of control programs and data which constitute a second program. The CPU 20 controls operations of individual modules of circuits using the RAM 18 as a working memory based on the control programs which are stored in advance in the ROM 17 by receiving signals from the touch sensor 15 and the push sensor 16 or control signals sent out from the game device 5, which will be described later, or automatically.

Additionally, a voice data is stored in the ROM 17, which is the storage means, which generates a crying voice (a mimic voice) of the dog from the toy 1. Further, stored in the ROM 17, which is the storage means, is data which causes a plurality of the sounds of a single frequency to be outputted from the toy 1. In addition, individual programs are stored in the ROM 17, which is the storage means, which cause the toy 1 to perform predetermined actions in response to control signals (codes) from the game device 5, which will be described later.

Namely, by the control program which is the second program stored in the ROM 17 being executed, the CPU 20 functions as a voice generation means 22a which generates a voice such as a crying voice of the dog and a single sound generation means 22b which generates a plurality of sounds of a single frequency which are different from each other, a light source control means 21 which causes the LEDs 11 of the toy 1 to emit light, a motor control means 29 which drives the motors of the toy 1, and a filter means 23 which detects a control signal (code) from the game device 5, which will be described later.

The loudspeaker 12 which is a sound generation means outputs a sound by receiving a signal from the CPU 20 via a sound generation circuit 12a. Sounds outputted include sounds of a voice band which are inputted into a microphone 53 equipped in the game device 5, which will be described later. The microphone 13, which is a voice input means, allows external sounds to be inputted thereinto, digitized the sound signals so inputted via a sound detection circuit 13a which includes an amplification circuit and transmits digitized signals to the CPU 20. In addition, the external sounds include sounds of a voice band which are outputted from a speaker 52 equipped in the game device 5, which will be described later.

The LEDs 11, which are light emitting means, is driven to emit light which falls within the visible light wavelength band by a light source driving circuit 11a which receives a signal from the CPU 20. Additionally, a motor 19 is driven by a motor drive circuit 19a which receives a signal from the CPU 20.

The touch sensor 15 and the push sensor 16, which are sensing means, sense a touching action performed by the user. Consequently, when the user strokes the back portion of the dog, the touch sensor 15 detects the pressing operation from the user and transmits to the CPU 20 a signal which signals that the touching action has been detected. Similarly, when the user rotates the tail portion of the dog which can be rotated in a back-and-forth direction (namely, the user can touch the tail portion to move the tail portion), the push sensor 16 detects the rotating action from the user and transmits to the CPU 20 a signal which signals that the rotation has been detected.

In addition, when the touch sensor 15 and the push sensor 16 are operated, or when the CPU 20 of the toy 1 receives a control signal (a signal made up of a combination of sound signals) from the game device 5, which will be described later, the CPU 20 generates a control signal that is to be outputted from the toy 1 in response to the operation signal or the control signal from the game device 5.

The control signal that is outputted from the toy 1 is made up of a combination of sounds of a single frequency. The sounds of a single frequency that are different from each other and which are sent out from the toy 1 are selected from a frequency band of 2000 to 3000 Hz. Specifically, the sounds of a single frequency that are different from each other and which are sent out from the toy 1 are sounds of five kinds which include a first sound selected from 3000 to 2900 Hz, a second sound selected from 2800 to 2700 Hz, a third sound selected from 2700 to 2600 Hz, a fourth sound selected from 2500 to 2400 Hz, and a fifth sound selected from 2400 to 2300 Hz. The control signal is formed by selecting, for example, three sounds out of five sounds from the first sound to the fifth sound and combining them together.

Namely, the control signal is made up of a combination of sounds selected from the first sound to the fifth sound. For example, the control signal is made up of selected sounds which are arranged in a time series fashion like the first sound that is generated at first, the third sound that is generated next, and the fifth sound that is the last generated. Additionally, there may be a situation in which the control signal is made up of selected sounds of the same kind like the first sound that is generated at first, the first sound that is generated next, and the first sound that is the last generated.

It should be noted that the sounds of a single frequency are not limited to those which are selected from the frequency band of 2000 to 3000 Hz and that sounds to be selected are not limited to the five kinds. However, there may be a situation in which when the width of a frequency band from which a selection is made is too narrow or when there are too many sounds to be selected, detection is made difficult due to frequencies of sounds selected being too close. In addition, when there are many sounds to be selected, there is caused a drawback that the user is caused to feel a sensation of physical unease. On the contrary, there may be a situation in which when the width of a frequency band is too wide or when there are too few sounds to be selected, due to too much difference among frequencies of sounds so selected, the sounds of a single frequency are easily affected by game sounds (sounds outputted in synchronism with the progress of a game excluding the sounds of a single frequency which make up the control signal) or peripheral noise, and there may also be a situation in which it becomes difficult to make the sounds of a single frequency cooperate with various types of game devices 5 which have different configurations. Additionally, when there are too few sounds to be selected, the number of kinds of control signals is reduced. Consequently, it is preferable to select frequencies of about five kinds from the frequency band of 2000 Hz to 3000 Hz.

Then, in this embodiment, an extraction of one sound out of the first sound to the fifth sound is implemented three times to thereby form one combined control signal (code) to be sent out from the loudspeaker 12 of the toy 1. It should be noted that the number of times a selection sound to be extracted is generated is not limited to three times, and hence, in order to increase control signals, extraction of a selection sound may be implemented four times or more.

Then, the control means is formed to arrange a plurality of the sounds of a single frequency which make up the control signal generated in a time series fashion and to send out sequentially the plurality of the sounds of a single frequency which are arranged in the time series fashion from the loudspeaker 12 of the toy 1 immediately before a voice (a crying voice of the dog) that is to be outputted from the loudspeaker 12 of the toy 1 is outputted. Specifically, as shown at (a) of FIG. 4, three sounds (for example, the first sound, the third sound, the fifth sound) which are extracted out of the first sound to the fifth sound (the plurality of the sounds of a single frequency) one by one are arranged in the time series fashion and are sent out sequentially at intervals of about 0.1 second over a length of time of about 0.05 second. Then, the crying voice (the sound) is outputted subsequently. It should be noted that the control signal may be sent out while being superposed on the sound (the crying voice of the dog) that is outputted from the loudspeaker 12 of the toy 1 as shown at (b) in FIG. 4.

In addition, by the control program stored in the ROM 17 being executed, the CPU 20 also functions as the filter means 23 which cuts off sounds of a predetermined voice band (a band excluding 7000 to 9000 Hz) out of sound signals which are inputted from the sound detection circuit 13*a*. Namely, the CPU 23 as the filter means 23 cuts off sounds of other frequency bands than a frequency band which corresponds to the control signals which are outputted from the loudspeaker 52 of the game device 5 out of the frequency bands of the sound signals which the CPU 20 receives so as to detect individually the sounds of a single frequency which are inputted into the microphone 13 of the toy 1. By so doing, the occurrence of a recognition error can be suppressed which error is attributed to the input of noise which is constituted by external sounds such as the game sounds and the voice of the user who is speaking together with the control signal which is made up of the sounds of a single frequency.

It should be noted that the filter means can be configured by providing a filter circuit (a hard filter) in the sound detection circuit 13*a* without making the CPU 20 to function as the filter means.

Consequently, this toy 1 is controlled so that the sounds of a single frequency (the control signal) that are arranged in the time series fashion and which are sent out while being superposed on the voice which is outputted from the loudspeaker 52 of the game device 5, which will be described later, or immediately before the voice is outputted are inputted into the microphone 13 of the toy 1 and the control program which corresponds to the combination of the sounds of a single frequency which are so inputted (or which is designated by the combination of the sounds of a single frequency) is read out from the ROM 17 of the toy 1 by the CPU 20 so as to output a voice or to perform a predetermined action. This predetermined action includes an action of outputting the control signal.

Namely, this toy 1 enables a mutual communication with the game device 5 by making use of a hardware configuration equipped in the game device 5 without making any additional change to the hardware configuration equipped in the game device 5 and operates in cooperation with the game device 5.

Next, the configuration of the game device 5 that is used in the toy set 100 will be described. As shown in the external view of FIG. 1 and a functional circuitry block diagram of FIG. 3, the game device 5 includes a display means 51 which is a liquid crystal display device, the loudspeaker 52 which is a sound generation means which outputs sounds of a voice band, the microphone 53 which is a voice input means into which sounds of the voice band are inputted, an operation input means 55 which is operated by the user and a storage medium mounting interface 54 and incorporates a control means.

The control means includes a CPU 60, a ROM 57 which is a storage means that is connected to the CPU 60 and a RAM 58. The ROM 57 is the storage means which stores a plurality of control programs which control the operation of the game device. The CPU 60 controls operations of individual modules of circuits using the RAM 58 as a working memory based on the control programs stored in advance in the ROM 57 by receiving signals from an operation input means (a cross key and push buttons, a touch panel) 55 or control signals sent out from the toy 1 or automatically. Additionally, this control means controls operations of individual modules of circuits in the game device 5 so as to read in programs stored in the storage medium 8 which is mounted in the game device 5 and to execute the programs so read in to thereby display an image on a display screen of the display means 51 or to output sound from the loudspeaker 52.

In addition, the storage medium 8 which makes up the toy set 100 is a card-type storage medium and includes a connecting specification which corresponds to the storage medium mounting interface 54 of the game device 5. Additionally, a game control program which is configured so as to be read into the game device 5 for execution by the control means of the game device 5 and data are stored as a first program in the storage medium 8.

When executed by the control means of the game device 5, the game control program stored in the storage medium 8 generates in the game device 5 a function to enable a mutual communication with the sound generating character toy 1 which operates in cooperation with the game device 5 by making use of a hardware configuration equipped in the game device 5 without making any additional change to the hardware configuration of the game device 5.

Specifically, this computer program which is stored in the storage medium 8 which is mounted in the storage mounting interface 54 of the game device 5 includes a plurality of control programs which impart a filter function, a control signal generation function and the like to the game device, a plurality of individual programs which are readout in response to control signals received from the toy 1 for execution and data which generates images including the character of the toy 1 and a voice (a game sound or the like). Additionally, the storage medium 8 includes data which generates a plurality of sounds of a single frequency which make up a control signal. Then, when the storage medium 8 is mounted in the storage medium mounting interface 54 and the game control program is read into the game device 5 for execution by the control means of the game device 5, the game control program makes the CPU 60 of the game device 5 fulfill functions of a filter means 63, a display control means 61, a voice generation means 62a and a single sound generation means 62b. Here, the display control means 61 is an output means which displays a display image on the display screen of the display means 51, and the voice generation means 62a is an output means which outputs a game sound from the loudspeaker 52.

The CPU 60 as the voice generation means 62a generates a voice such as a game sound. Additionally, the CPU 60 as the single sound generation means 62b generates a plurality of sounds of a single frequency which are different from each other.

The loudspeaker 52 which is a sound generation means receives a signal from the CPU 60 by way of a sound generation circuit 52a to output sounds. The sounds so outputted include sounds of a voice band which are inputted into the microphone 13 (refer to FIG. 2) which is equipped in the toy 1. External sounds are inputted into the microphone 53 which is a voice input means, and the microphone 53 digitizes the sound signals so inputted via a sound detection circuit 53a which includes an amplification circuit and transmits the digitized signals to the CPU 60. In addition, the external sounds include sounds of a voice band which are outputted from the loudspeaker 12 (refer to FIG. 3) of the toy 1.

The display means 51 is the liquid crystal display device and displays various kinds of information including game images, setting images for various types of settings and messages in relation to various types of processings based on signals transmitted from the CPU 60 as a result of the programs read out from the storage medium 8 being executed.

The operation input means 55 includes a cross key and push buttons or a touch panel that includes a touch sensor surface on the liquid crystal display device and which is integrated with the display screen and detects an operation input by the user. When the user presses the operation input means 55 to operate, the operation input means 55 detects the pressing operation by the user and transmits to the CPU 60 a signal which signals that pressing has been detected.

Then, when the operation input means 55 is operated or when the CPU 60 of the game device 5 receives a control signal (a signal made up of a combination of sound signals) from the toy 1 as have been described above, the CPU 60 of the game device 5 generates a control signal that is to be outputted from the game device 5 in response to the operation signal or the control signal from the toy 1.

In addition, when read into the game device 5 for execution by the control means of the game device 5, the game control program stored in the storage medium 8 makes the CPU 60 fulfill a function as a sender means to generate a control signal that is to be outputted from the game device 5 and which is made up of a combination of sounds of a single frequency which are different from each other, to arrange a plurality of the sounds of a single frequency which make up the control signal generated in a time series fashion and to send out sequentially the sounds of a single frequency which are arranged in the time series fashion from the loudspeaker 52 of the game device 5 while superposing the sounds of a single frequency which are arranged in the time series fashion on the voice (the game sound) which is outputted in relation to the image which is being displayed on the display screen of the display means 51 of the game device 5 or immediately before the voice (the game sound) is outputted. Namely, when executed by the control means of the game device 5, the game control program stored in the storage medium 8 generates a control signal which designates a control program which controls the toy 1 to output a voice or to perform a predetermined action and sends it out from the loudspeaker 52 of the game device 5.

Then, a control signal that is outputted from the game device 5 is made up of a combination of sounds of a single frequency. Here, sounds of a single frequency that are different from each other and which are sent out by the sender means of the game device 5 which is generated by the execution of the program read in from the storage medium 8 which makes up the toy set 100 are sounds of five kinds including a first sound to a fifth sound which are selected from a frequency band of 7000 to 9000 Hz. Then, a control signal is formed by implementing an extraction of one sound out of the five kinds three times. Then, the sounds so extracted (a plurality of the sounds of a single frequency) are arranged in a time series fashion and are then sent out sequentially at intervals of about 0.1 second over a length of time of about 0.05 second.

It should be noted that the sounds of a single frequency are not limited to those which are selected from the frequency band of 7000 to 9000 Hz, and the sounds to be selected are not limited to the five kinds. The same selection reason as that for the selection sounds of the toy 1 is also applied hereto. In addition, in this embodiment, an extraction of one sound out of the first sound to the fifth sound is implemented three times, and the sounds so extracted are combined together for output from the game device 5 as one control signal (code).

In addition, by being read into the game device 5 and executed by the control means of the game device 5, the game control program arranges a plurality of the sounds of a single frequency which make up the control signal so generated in a time series fashion and sends out sequentially the plurality of the sounds of a single frequency which are arranged in the time series fashion from the loudspeaker 52 of the game device 5 while superposing the sounds of a single frequency which are arranged in the time series fashion on the voice (the game sound) that is outputted from the game device 5 or immediately before the voice (the game sound) is radiated.

Additionally, by the control program stored in the storage medium 8 being executed, the CPU 60 also functions as the filter means 63 which cuts off sounds of a predetermined voice band (a band excluding 2000 to 3000 Hz) out of sound signals which are inputted into the CPU 60 from the microphone 53 by way of the sound detection circuit 53a. Namely, the CPU 60 which functions as the filter means 63 cuts off sounds of frequency bands excluding a frequency band which corresponds to the control signals which are outputted from the toy 1 out of the frequency bands of the sound signals received thereby so as to detect individually the sounds of a single frequency which are inputted into the microphone 53 of the game device 5. By so doing, the occurrence of a recognition error can be suppressed which error is attributed to the input of noise which is constituted by external sounds such as a crying voice of the dog (a mimic voice) and the voice of the user who is speaking together with the control signal.

In this way, by being executed by the control means of the game device 5, the game control program stored in the storage medium 8 can make the CPU 60 of the game device 5 fulfill the various functions, and therefore, the CPU 60 can realize a communication with the toy 1 without making any additional mechanical or circuitry-related improvement in hardware in the game device 5.

Figure 4:
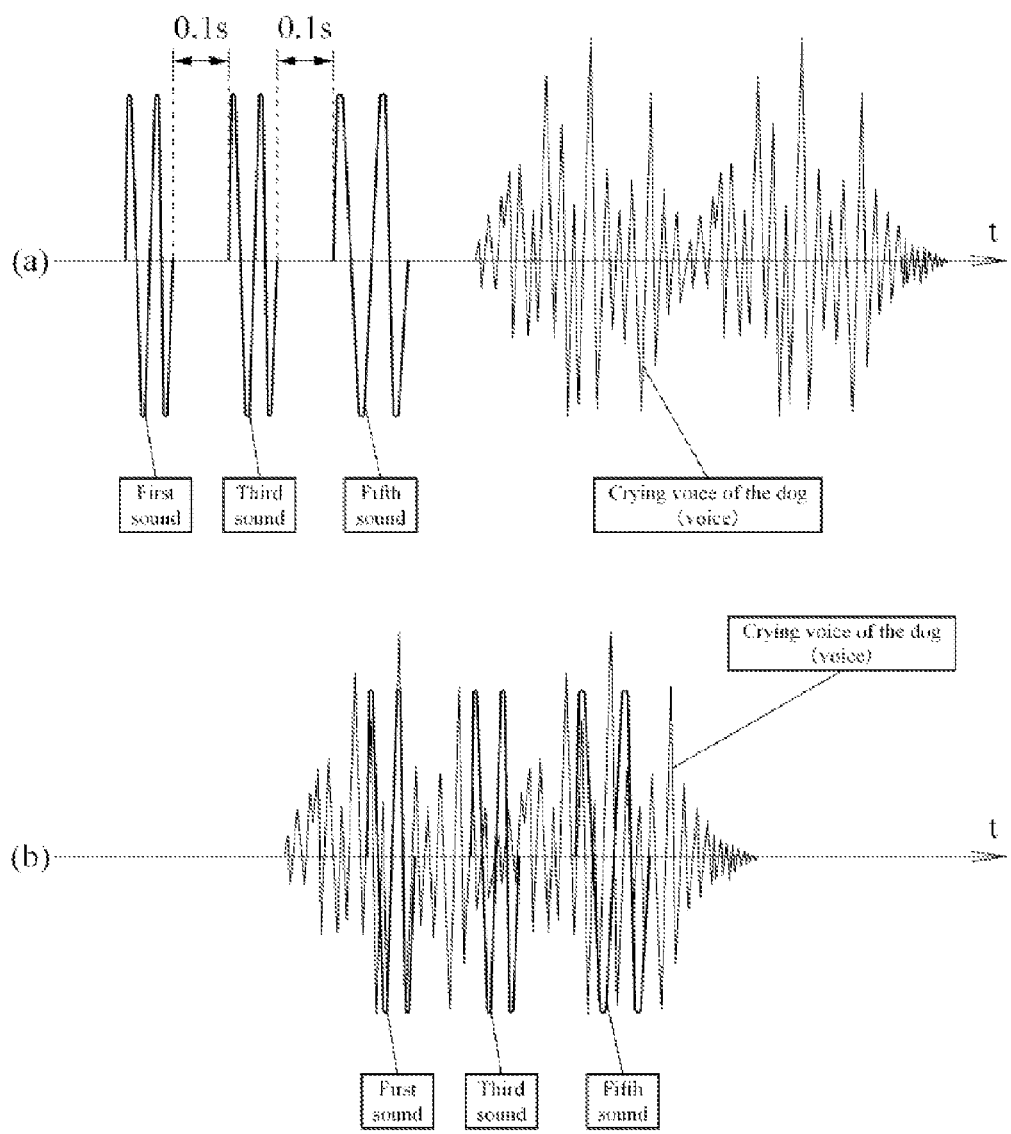
FIG. 4 shows explanatory diagrams of waveforms depicting sounds of a single frequency and a voice which are outputted from the toy according to the embodiment of the invention.

Further, in the case of the configuration in which the control signal from the toy 1 is sent out immediately before the voice is radiated (refer to part (a) in FIG. 4), the game control program that is stored in the storage medium 8 controls so that words which correspond to the control signal are displayed on the display screen of the display means 51 of the game device 5 in synchronism with a voice (a crying voice of the dog) which is outputted immediately after the control signal.

In addition, the game control program that is stored in the storage medium 8 includes data which controls so that a voice including words corresponding to the crying voice of the dog which is outputted from the toy 1 is outputted from the loudspeaker 52 of the game device 5.

Namely, by this game control program being read into the game device 5 and executed by the control means of the game device 5, when the sounds of a single frequency (the control signal) that are arranged in the time series fashion and which are sent out while being superposed on the voice that is outputted from the loudspeaker 12 of the toy 1 or immediately before the voice is outputted are inputted into the control means by way of the microphone 53 of the game device 5 and are then detected by the filter means 63, the game control program reads out a control program which corresponds to the combination of the sounds of a single frequency which are arranged in the time series fashion (or which is designated by the combination of the sounds of a single frequency) so as to make the output means output at least either of an image and a voice.

In addition, it is possible to configure so that even with the toy 1 eliminated, by this game control program being read into the game device 5 for execution, the user is allowed to progress a predetermined game. For example, in the event that the game control program includes a program of bringing up the character, when he or she stays at home, the user continues to progress the game while communicating with the toy 1, whereas when he or she leaves home, the user sets the toy set 100 in a leave-home mode, so that without the toy 1 being carried by the user, the user can progress the game so as to bring up the character by feeding or playing with the character by operating the operation input means 55 while looking at the image of the character which is being displayed on the display screen of the display means 51 of the game device 5.

Hereinafter, a flow of a communication system between the game device 5 and the toy 1 which is implemented based on the first program which executes the operation control and processes in the game device 5 and the second program which executes the operation control and processes in the toy 1, that is, the processes which are executed by the control means of the toy 1 and the control means of the game device 5 which operates based on the game control program stored in the storage medium 8 will be described together with operation examples of the toy 1 and the game device 5. This communication system between the game device 5 and the toy 1 is a system which enables a mutual communication in the voice band between the toy 1 configured in the way described above and the game device 5 in which the storage medium 8 is mounted by making use of the hardware configuration equipped in the game device 5 without making any additional change to the hardware configuration of the game device 5.

Figure 5:
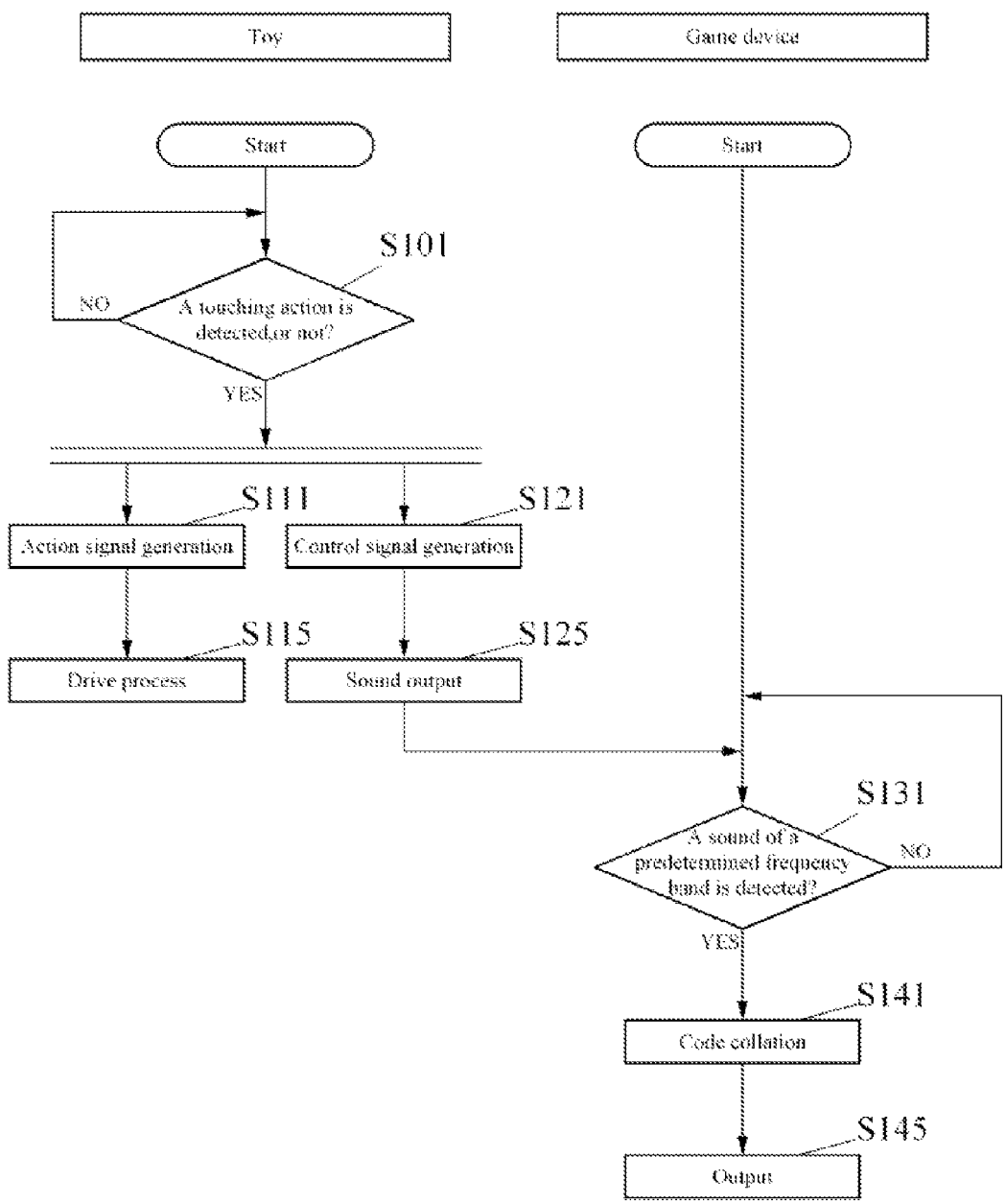
FIG. 5 is a flowchart depicting a control flow of the game device and the toy in a direct operation mode according to the embodiment of the invention.
Figure 6:
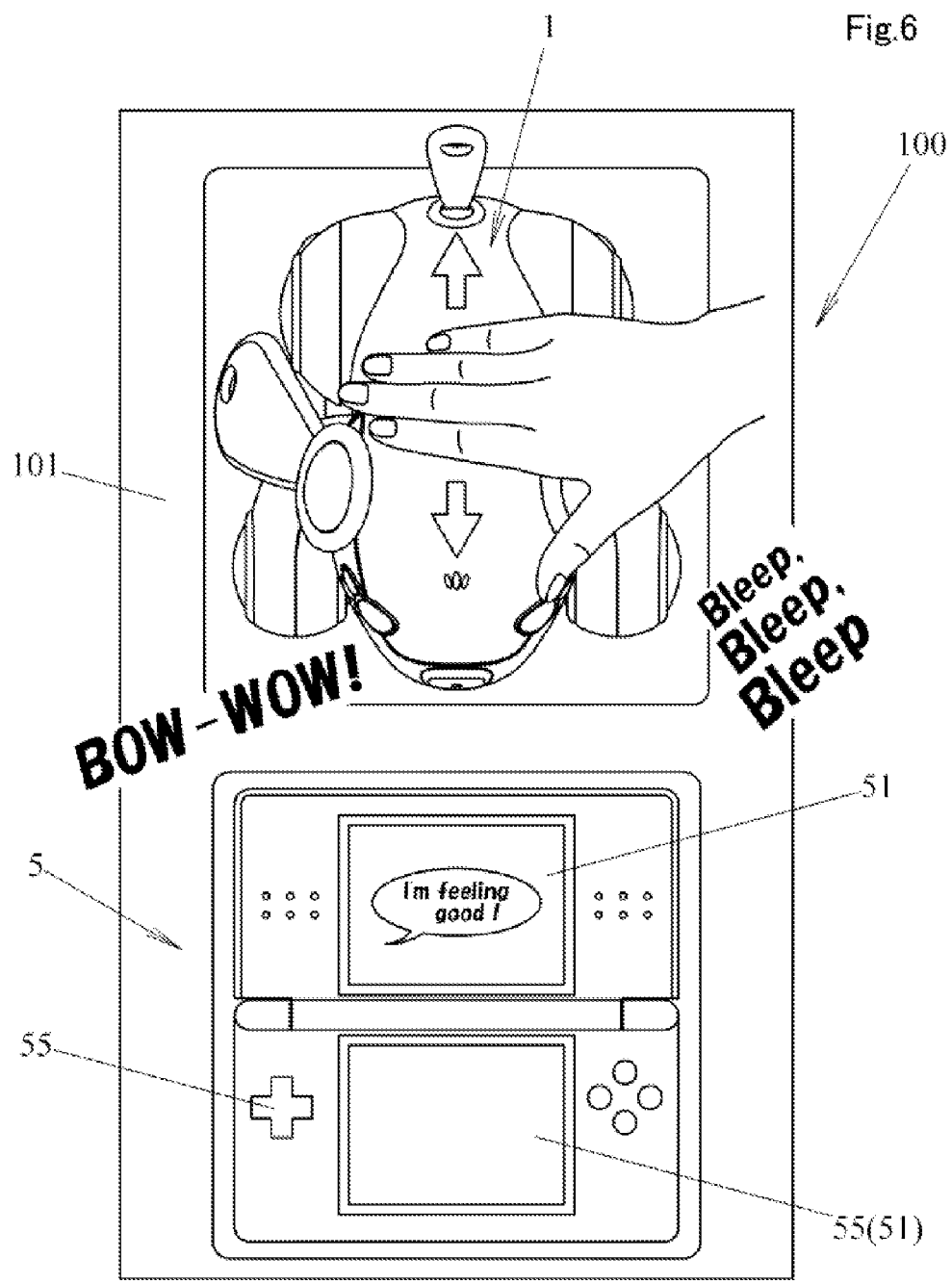
FIG. 6 is a diagram depicting an example of an operation of the toy set when in the direct operation mode according to the embodiment of the invention.

FIG. 5 is a flowchart depicting a control flow in a direct operation mode. FIG. 6 is a diagram depicting an example of an operation of the toy set 100 according to the embodiment when in the direct operation mode. FIG. 7 is a flowchart depicting a control flow in a game device operation mode. FIG. 8 shows diagrams depicting examples of operations of the toy set 100 according to the embodiment when in the game device operation mode.

Firstly, the control flow in the direction operation mode will be described. As shown in FIG. 5, when the direct operation mode is initiated, the control means of the toy 1 is kept in a touching action detection waiting state until it is determined that a touching action has been detected in a touching action detection process (step S101). As this occurs, as shown in FIG. 6, when the user strokes the back portion of the toy 1, the touch sensor 15 detects the pressing operation by the user and transmits a signal which signals that pressing has been detected to the CPU 20 as shown in FIG. 5 (step S101).

Then, the control means of the toy 1 executes an action signal generation process (step S111) for making the toy 1 perform a predetermined action and a control signal generation process (step S121) for generating a control signal that is to be outputted from the toy in response to the reception of the operation signal.

When the action signal is generated in the action signal generation process (step S111), the control means transmits the action signal to a drive target (an individual module) and executes a drive process (step S115) for driving the drive target. Here, the drive target includes the motors 19 which drive the head portion and the arm portions, the loudspeaker 12 and the LEDs 11.

Consequently, when the drive process (step S115) is executed, the toy 1 oscillates the head portion (tilts the head) by actuating the head portion motor 19 by the motor drive circuit 19*a* for the head portion, rotates the arm portions (lies down) by actuating the arm portion motors 19 by the motor drive circuit 19*a* for the arm portions, radiates a voice (cries) by actuating the loudspeaker 12 by the sound generation circuit 12*a* or shines the eyes (expresses a state of the pet) by actuating the LEDs 11 by the light source drive circuit 11*a*.

Then, the CPU 20 generates a predetermined control signal in the control signal generation process (step S121). This control signal designates a control program which is to be executed in the game device 5 and is a sound signal which is formed by a combination of three sounds extracted one by one in three steps out of the first sound to the fifth sound which are arranged in the time series fashion. Namely, the control signal is generated as the voice which is made up of a plurality of the sounds of a single frequency that are arranged in the time series fashion and which are radiated sequentially from the loudspeaker 12 of the toy 1. Then, the CPU 20 generates this control signal in response to the signal which is detected in the touching action detection process (S101).

In addition, when configured so that an activation time and a mood parameter which is changed in response to an operation by the user are stored in the RAM 18, in the control signal generation process (step S121), the toy 1 can also generate a control signal in response to not only the signal which is detected in the touching action detection process (step S101) but also a numeric value of the mood parameter.

Then, when the predetermined control signal is generated in the control signal generation process (step S121), the control means drives the sound generation circuit 12*a* so as to execute a sound output process (step S125) for sending out the control signal (a plurality of the sounds of a single frequency) by the loudspeaker 12.

In addition, this sound output process (step S125) is executed in association with the drive process (step S115). Specifically, when a crying voice of the dog is radiated from the loudspeaker 12 in the drive process (step S115), the output of the control signal which is made up of the sounds of a single frequency which are arranged in the time series fashion is executed in the sound output process (step S125) immediately before the voice (the crying voice) is outputted. It should be noted that the control signal may be sent out while being superposed on the voice (the crying voice).

On the other hand, when the direct operation mode is initiated, in a sound detection process (step S131), the control means of the game device 5 is kept in a sound input waiting state (a control signal input waiting state) until it is determined that a sound of a predetermined frequency band has been inputted. Namely, when the control signal (a plurality of the sounds of a single frequency within the predetermined frequency band) is sent out from the loudspeaker 12 of the toy 1 (step S125) and this control signal is inputted into the microphone 53, the sounds of a single frequency so inputted are amplified in the sound detection circuit 53a, and thereafter, sounds of other frequency bands than the frequency band of the control signal are cut off by the filter means 63, so that the signal made up of the sounds of a single frequency is transmitted to the CPU 60 (step S131).

Then, the control means of the game device 5 extracts an output signal which corresponds to the control signal (code) which is detected in the sound detection process (step S131) from the ROM 57. Namely, the control means of the game device 5 executes a code collation process (step S141) for reading out an output signal as a control program which is designated by the combination of the sounds of a single frequency arranged in the time series fashion which is detected in the sound detection process (step S131) from the ROM 57.

Further, the control means of the game device 5 transmits the output signal which is extracted in the code collation process (step S141) to an output target and executes an output process (step S145) for actuating the output target. Here, the output target is the display means 51 or the loudspeaker 52. It should be noted that when a vibration mechanism or a light emitting element such as an LED is provided in the game device 5, these become output targets.

Consequently, when the output process (step S145) is executed, the display means 51 is actuated by a display drive circuit 51a so as to display a predetermined image or words (a sentence) on the display screen or the loudspeaker 52 is actuated by the sound generation circuit 52a so as to radiate a predetermined game sound or words. Then, the predetermined words (sentence) that are displayed on the display screen and the predetermined words that are radiated from the loudspeaker 52 are words into which a crying voice of the character (dog) toy 1 is, as it were, translated. Namely, for example, when the toy 1 barks "bow-wow" in response to a stroking action on the back portion by the user as shown in FIG. 6, the game device 5 can display a sentence saying "I'm feeling good." on the display screen of the display device 51 of the game device 5 or can radiate an utterance saying "I'm feeling good." from the loudspeaker 52. Consequently, the user can understand how the character (dog) toy 1 feels and becomes attached thereto more.

Here, when the control signal from the toy 1 is sent out immediately before the voice (the crying voice), it is preferable that the control program stored in the storage medium 8 is configured so that words which correspond to the control signal are displayed on the display screen of the display means 51 of the game device 5 in synchronism with a voice that is outputted immediately after the control signal. By so doing, the control signal is radiated from the toy 1 with sounds like "bleep, bleep, bleep" and after the control signal is detected by the game device 5, the game device 5 can display the sentence saying "I'm feeling good" on the display screen of the display device 51 with an interruption of only a predetermined length of time at the same time as or immediately after a crying voice of "bow-wow" is radiated from the toy 1, thereby making it possible to enhance the contrivance with respect to the conversation with the toy 1. It should be noted that the image of the character which is the external appearance of the toy 1 may be displayed together with the sentence on the display screen of the display device 51.

Next, the control flow in the game device operation mode will be described. As shown in FIG. 7, when the game device operation mode is initiated, the control means of the game device 5 is kept in an operation signal input waiting state until it is determined that an operation signal has been detected in an operation signal detection process (step S201). As this occurs, as shown at part (a) in FIG. 8, when the user operates the operation input means (the touch panel) 55 of the game device 5, the operation input means 55 detects the pressing operation by the user and transmits a signal which signals that pressing has been detected to the CPU 60 as shown in FIG. 7 (step S201).

Then, the control means of the game device 5 executes a toy corresponding signal determination process (step S205) for determining whether or not the received operation signal signals the operation to send the control signal to the toy 1. Then, if it is determined in the toy corresponding signal determination process (step S205) that the received operation signal does not signal the operation to send the control signal to the toy 1, the control means of the game device 5 executes a game progressing process (step S215) for progressing the game in response to the operation signal. In this game progressing process (step S215), the control means of the game device 5 displays an image corresponding to the operation on the display screen of the display means 51 or outputs a voice (a game sound) corresponding to the operation from the loudspeaker 52.

In contrast to this, if it is determined in the toy corresponding signal determination process (step S205) that the received operation signal signals the operation to send the control signal to the toy 1, the control means executes a game progressing process (step S221) for progressing the game in response to the operation signal and a control signal generation process (step S231) for generating a control signal that is to be outputted from the game device 5.

Then, the CPU 60 generates a predetermined control signal in the control signal generation process (step S231). This control signal designates a control program that is to be executed in the toy 1 and is a sound signal which is a combination of three sounds which are extracted one by one in three steps out of the first sound to the fifth sound which are arranged in the time series fashion. Namely, the control signal is generated as a voice in which a plurality of the sounds of a single frequency that are radiated sequentially from the loudspeaker 52 of the game device 5 are arranged in the time series fashion. Then, the CPU 60 generates a control signal that is to be outputted based on the signal detected in the operation signal detection process (S201) and the signal which is associated with the progress in the game (that is, which is associated with the game mode).

In the event that the game device 5 is configured so that a growing parameter is stored in the RAM 58 as being changed according to the degree of progress of the game or in response to the operation by the user, in the control signal generation process (step S231), a control signal can also be generated based not only on the signal detected in the operation signal detection process (step S201) and the signal which is associated with the progress of the game (which is associated with the game mode) but also on a numeric value of this growing parameter.

Then, when a predetermined control signal is generated in the control signal generation process (step S231), the control means executes a sound output process (step S235) for driving the sound generation circuit 52a so as to cause the loudspeaker 52 to send out the control signal (a plurality of the sounds of a single frequency).

In addition, this sound output process (step S235) is executed in association with the game progressing process (step S221). Specifically, when a game sound is radiated from the loudspeaker 52 in the game progressing process (step S221), the control signal is sent out while being superposed on the voice (the game sound) or immediately before the voice (the game sound) is generated.

On the other hand, when the game device operation mode is initiated, the control means of the toy 1 is kept in a sound input waiting state (a control signal input waiting state) until it is determined that a sound of a predetermined frequency band has been inputted in a sound detection process (step S241). Namely, when a control signal (a plurality of sounds of a single frequency which falls in a predetermined frequency band) is sent out from the loudspeaker 52 of the game device 5 (step S235) and this control signal is inputted into the microphone 13, the sounds of a single frequency so inputted are amplified by the sound detection circuit 13a, and thereafter, other frequency bands than the frequency band of the control signal are cut off by the filter means 23, whereby the control signal is transmitted to the CPU 20 as a signal of the sounds of a single frequency (step S241).

Then, the control means of the toy 1 extracts an output signal which corresponds to the control signal (code) detected in the sound detection process (step S241) from the ROM 17. Namely, the control means of the toy 1 executes a code collation process (step S249) for reading out an output signal as a control program which is designated by the combination of the sounds of a single frequency that are arranged in the time series fashion and which are detected in the sound detection process (step S241) from the ROM 17.

Further, the control means of the toy 1 executes in response to the output signal which is extracted in the code collation process (step S249) an action signal generation process (step S251) for causing the toy 1 to perform a predetermined action and a control signal generation process (step S261) for generating a control signal that is to be outputted from the toy 1.

When generating the action signal in the action signal generation process (step S251), the control means of the toy 1 transmits the action signal to a drive target to execute a drive process (step S255) for driving the drive target. The action signal generation process (step S251) and the drive process (step S255) are the same processes as the action signal generation process (step S111) and the drive process (step S115) (refer to FIG. 5) in the direct drive mode.

Consequently, when the drive process (step S255) is executed, the character toy 1 tilts the head, lies down or expresses an emotional feeling or a health state by crying or shining the eyes. For example, as shown at part (a) in FIG. 8, with "meat with bone" displayed on the touch panel which functions as the operation input means 55 as well as the display means 51 of the game device 5, when the user touches with a touch pen the portion of the touch panel where the "meat with bone" is displayed, a control signal made of sounds of a single frequency is radiated from the game device 5 with sounds like "bleep, bleep, bleep" and the toy 1 which receives the control signal can bark "bow-wow" and can radiate a "mumbling" voice as generated when the pet is eating food mumblingly while lying down. Consequently, since he or she can take care of the character (dog) toy 1, the user becomes more attached to the toy 1.

Then, as in the control signal generation process (step S121) and the sound output process (step S125) in the direct operation mode that have been described above, the control means of the toy 1 generates a predetermined control signal in a control signal generation process (step S261) and causes the control signal (a plurality of the sounds of a single frequency) to be outputted by the loudspeaker 12 by driving the sound generation circuit 12a in a sound output process (step S265). In addition, the control means of the toy 1 generates a control signal in response to the output signal which is extracted through collation in the code collation process (S249).

Namely, this toy 1 is controlled by the CPU 20 so as to perform predetermined actions including actions of inputting the sounds of a single frequency which are arranged in the time series fashion individually into the microphone 13 of the toy 1 while superposing the sounds of a single frequency which are arranged in the time series fashion on the voice (the game sound) that is radiated by the loudspeaker 52 of the game device 5 or immediately before the voice (the game sound) is radiated, detecting the control signal out of the sounds which are inputted into the microphone 13 (step S241), reading out a control program which corresponds to the combination of the sounds of a single frequency detected (that is, which is designated by the detected control signal) from the ROM 17 which is the storage means of the toy 1 for radiation or the sound output process (step S265) for outputting the control signal.

Namely, the toy 1 is designed not only to actuate the individual portions thereof but also to communicate with the game device 5 by sending out the control signal with sounds like "bleep, bleep, bleep" as shown at part (b) in FIG. 8 after the toy 1 has outputted the voice such as the "mumbling" voice, for example.

Then, as shown in FIG. 7, when the sound output process (step S265) is executed, the same processes as steps S131 to S145 in the direction operation mode are executed. Namely, the sound signal is transmitted to the CPU 60 via the microphone 53 of the game device 5, and when the control signal is detected from the sound signal (step S271), an output signal which corresponds to the control signal (code) is extracted through a code collation process (step S281).

Further, the control means transmits the output signal which is extracted in the code collation process (step S281) to a drive target and executes an output process (step S285) for actuating the output target. Consequently, when the output process (step S285) is executed, a predetermined sentence is displayed on the display screen of the display means 51 or predetermined words are radiated by the loudspeaker 52.

Namely, as shown at part (b) in FIG. 8, the control means of the toy 1 outputs the voice barking "bow-wow" together with the control signal with sounds like "bleep, bleep, bleep" or immediately after the control signal is sent out, while the game device 5 which receives the control signal from the toy 1 can cause the display means 51 to display words saying "It's very delicious." Consequently, the user can have knowledge concerning the preference of the pet with respect to food by listening to how the pet feels after the user has fed the pet, and therefore, the user can become more attached to the pet. Additionally, when the growing parameter data of the pet stored in the RAM 58 are updated, the user can also confirm the growth of the pet by displaying a sentence saying "the friendliness has been enhanced!" on the touch panel.

Thus, according to the invention, since the sounds of the voice band which are inputted into the control means byway of the microphone 53 equipped in the game device 5 and the sounds of the voice band which are radiated by the loudspeaker 52 are made use of in the transmission/reception means (that is, the communication means) between the game device 5 and the toy 1, the communication of the control signals between the game device 5 and the toy 1 can be realized while maintaining the hardware configuration of the existing game device 5 without adding any hardware to the existing game device 5.

In addition, the individual sounds which make up the control signal are the sounds of a single frequency, and the sounds of a single frequency are transmitted individually one by one (one by one at intervals of the predetermined length of time), while the sounds of a specific single frequency are detected individually one by one out of the crying voice or the game sound received on the reception side. Therefore, the configuration of the toy set 100 can be made simple.

Further, the communication utilizing the voice band between the game device 5 and the toy 1 is implemented in such an environment that is surrounded by much noise including voices of the user child and his or her friends which operate the game device 5 and the toy 1 and the family members. However, since only the sounds of a single frequency are detected sequentially and individually, even in the environment where there is much noise in the voice band, the system which enables the detection of the specific sounds without adding any exclusive hardware to the game device 5 can be realized with the simple program. The code is made up of the combination of the sounds which are detected in this way or the combination of the five sounds, for example, and the data which generates the images including the character and the voices (crying voice, words and BGM) are selected using the code as the address. Therefore, data of many kinds of images, crying voices and voices are stored in advance in the storage medium 8, thereby making it possible to provide a wide variety of plays.

In addition, the toy 1 is the stylized toy of the character which imitates a dog and is configured so as to radiate the crying voice of the dog, thereby making it possible to enhance the interestingness as the pet robot. It should be noted that the character is not limited to the dog, and hence, such an animal as cat or monkey may be adopted. Alternatively, a human being, an article or a creation may be adopted.

Additionally, the control program stored in the storage medium 8 controls the game device 5 so that the voices including the words which correspond to the crying voice of the dog are outputted from the loudspeaker 52 of the game device 5, whereby the voice from the heart of the robot can appeal to the sensation of hearing of the user, thereby making it possible to provide the toy set 100 as one in which the interestingness is enhanced further.

Further, when the control program stored in the storage medium 8 is configured so that the control signal radiated by the toy 1 is transmitted immediately before the voice is radiated, by adopting the configuration in which the words (the sentence) which correspond to the control signal are displayed on the display screen of the game device 5 in synchronism with the voice which is radiated immediately after the control signal, the corresponding words (sentence) can be displayed on the display screen of the game device 5 at the same time as the toy 1 radiates the voice (the crying voice) or immediately after the toy 1 radiates the voice (the crying voice). Therefore, the interestingness with respect to the conversation with the toy 1 is enhanced.

In addition, the sounds of a single frequency that are different from each other and which are used as the control signal radiated from the toy 1 are selected from the frequency band of 2000 to 3000 Hz, and the sounds of a single frequency that are different from each other and which are radiated from the game device 5 are selected from the frequency band of 7000 to 9000 Hz, whereby since the control signals are made easy to be detected both at the game device 5 and the toy 1, a smooth communication can be enabled.

Additionally, the control signal is made up of the combination of the sounds selected from the first sound to the fifth sound, and the first sound is selected from 3000 to 2900 Hz, the second sound is selected from 2800 to 2700 Hz, the third sound is selected from 2700 to 2600 Hz, the fourth sound is selected from 2500 to 2400 Hz, and the fifth sound is selected from 2400 to 2300 Hz, whereby the control signal is made easy to be detected at the game device 5, and a number of codes can be set.

In addition, in the event that the control signal is formed by the three sounds which are extracted one by one in the three steps out of the first sound to the fifth sound, codes of 125 types can be set. Additionally, in the event that the number of sounds to be outputted is three and the intervals at which the individual selected sounds are outputted is of the order of 0.1 second, a natural conversation with the toy 1 can be realized without causing the user to feel the sensation of physical unease.

Then, the invention is not limited to the embodiment that has been described heretofore, and hence, free modifications or improvements can be made thereto without departing from the spirit and scope of the invention. For example, the frequency band of the control signal that is outputted from the toy 1 and the frequency band of the control signal that is outputted from the game device 5 may be made the same or may partly be overlapped each other.

In addition, as the configuration in which the sounds of a single frequency are outputted from the toy 1 as the control signal, a plurality of the sounds of a single frequency may be outputted by varying the frequency by the PWM system or digital signals which are held in advance as voice data can also be outputted through conversion via a D/A converter. In the event that the latter is adopted, the sound distortion can preferably be suppressed.

Additionally, the details of the operations of the game device 5 and the toy 1 which are performed by the communication between the game device 5 and the toy 1 are not limited to the examples described above. For example, the toy set 100 may be configured so that the user can play a competing game such as a Whack-a-mole game with the character toy 1 by operating the game device 5. As this occurs, an image of the arm of the character is displayed on the display screen of the display means 51 so as to enhance the quality of the competing game with respect to the sensation of being present at the site. Further, when a game which is executed by the game device 5 is a racing game, in the event that the toy set 100 is configured so that obstacles appearing as the game is progressing are eliminated by receiving a control signal from the character toy 1 which functions as a collaborator, the user can enjoy playing the game by progressing the game together with the character toy 1.

Further, while the game control program is described as being provided from the storage medium by way of the storage medium mounting interface which is provided in the game device, when a target game device includes a network connecting means such as the internet and includes a function to execute a game control program which is downloaded via the network, the game control program may be provided by being read into the game device by making use of the network connecting means.

In addition, in the embodiment, while the toy is described as being the dog-shaped toy, for example, the toy may be a toy that imitates a handle bar of a motorbike or a steering wheel of a motor vehicle or further a winding-up portion of a fishing reel and which is configured to generate to radiate sounds in response to the operation of the toy. Then, a control signal which is made up of a combination of sounds of a single frequency according to the invention may be sent out from the sound generation means while being superposed it on the operation sound. Additionally, in the embodiment, while the toy set is described as being the game-dedicated equipment (the game device), target electronic equipment may be an electronic device such as a portable terminal (a mobile phone) which has a microphone and a loudspeaker and which is configured so as to operate a game.

INDUSTRIAL APPLICABILITY

According to the invention, since sounds of a voice band which are inputted into a control means by way of a microphone 53 which is a voice input means equipped in a game device 5 and sounds of a voice band which are radiated by a loudspeaker 52 which is a sound generation means are made use of in a transmission/reception means (that is, a communication means) between the game device 5 and a toy 1, a communication of a control signal between the game device 5 and the character toy 1 is realized while maintaining a hardware configuration of the existing game device 5 without adding any hardware to the existing game device 5, thereby making it possible to enjoy playing a game while operating the character toy 1.

The invention claimed is:

1. In a toy set of an interactive toy and a program product configured to operate in cooperation with an electronic device equipped with a sound input means, a sound output means and a display means, and configured to execute a game based on a program installed from the program product,
   (a) the program product comprising a plurality of individual programs and data which generates an image and a sound related to the interactive toy, said program product further comprising, a control program configured to impart to the electronic device the following functions:
      a filter function configured to detect a code formed of a sequence of a plurality of distinct single frequency sounds inputted into the sound input means of the electronic device, the sequence of the plurality of distinct single frequency sounds having frequencies different from one another arranged in a time series;
      a program-selection function to read out one of said plurality of individual programs correspondingly to said code detected by the filter function, and execute the read-out individual program so that the electronic device outputs at least either of an image and a sound related to the interactive toy;
      a control-code generating function configured to generate a control code formed of a sequence of single frequency sounds including frequencies different from one another;
      a sound generating function configured to arrange the sequence of single frequency sounds generated by the control-code generating function sequentially in time series; and
      a sound-outputting function configured to send out the sequence of single frequency sounds from the sound output means of the electronic device, such that the sending out of the sequence of single frequency sounds is performed by superposing such respective single frequency sounds on a game sound which is outputted in cooperation with an image displayed on the display screen of the display means or by sending such sequence of single frequency sounds immediately before the game sound is outputted, and
   (b) the interactive toy comprising a sound output means configured to output a sound of a frequency band of the sound input means equipped on the electronic device, a sound input means, a control means, a sensing means configured to sense a touching action by a user, a sound output means, and a storage means storing a plurality of individual programs and a control program configured to impart to the interactive toy the following functions;
      a control-code generating function configured to generate a control code formed of a sequence of single frequency sounds including frequencies different from one another;
      a sound generating function configured to arrange the sequence of single frequency sounds generated by the control-code generating function sequentially in time series;
      a sound-outputting function configured to send out the sequence of single frequency sounds from the sound output means of the interactive toy, such that the sending out of the sequence of single frequency sounds is performed by superposing such respective single frequency sounds on a sound which is outputted from the sound output means of the interactive toy or by sending such sequence of single frequency sounds immediately before the sound is outputted from the interactive toy,
      a filter function configured to detect a code formed of a sequence of single frequency sounds from a sound received from the electronic, device; and
      a program-selection function to read out one of said plurality of individual programs stored in the storage means correspondingly to said code detected by the filter function, and execute the read-out individual program so that the interactive toy outputs a sound or performs a predetermined action,
   wherein a mutual interactive communication between the electronic device and the interactive toy is enabled without making any additional change to a hardware configuration of the electronic device.

2. In the toy set according to claim 1, said toy set further comprising:
   a storage medium which stores the program product; and
   a connecting interface configured to comply with a connecting specification installed on the electronic device, so that the storage medium is mountable to the electronic device and the programs and data are executably read from the storage medium into the electronic device for execution by control means of the electronic device.

3. In the toy set as set forth in claim 1, an external shape of the interactive toy imitating a dog, and said program product including data which generates a crying voice of the dog.

4. In the toy set as set forth in claim 1, wherein one of the individual programs is configured to cause the electronic device to output a voice message correspondingly to the crying voice outputted from the interactive toy.

5. In the toy set as set forth in claim 1,
wherein the interactive toy is configured to send the control code formed of the sequence of the single frequency sounds immediately before outputting a sound from the sound output means of the interactive toy, and
wherein one of the individual programs is configured to cause the electronic device to display a message on the display screen of the display means correspondingly to the received control code and in synchronism with a timing of outputting the sound from the interactive toy.

6. In the toy set as set forth in claim 1, wherein said single frequency sounds configuring the control codes are selected individually from a frequency band of 2000 to 3000 Hz, and sounds of selected single frequency sounds are sent out at intervals sequentially arranged in a time series.

7. In the toy set as set forth in claim 6, wherein, in generating a control code, single-frequency sounds are selected from a group consisting of a first frequency sound selected from 3000 to 2900 Hz, a second frequency sound selected from 2800 to 2700 Hz, a third frequency sound selected from 2700 to 2600 Hz, a fourth frequency sound selected from 2500 to 2400 Hz, and a fifth frequency sound selected from 2400 to 2300 Hz, and the control code is made up of a combination of plural single frequency sounds selected out of the first to the fifth single frequency sounds.

8. In the toy set as set forth in claim 1, wherein single frequency sounds configuring a control code are selected from a frequency hand of 7000 to 9000 Hz, and selected single frequency sounds are sent out at intervals sequentially arranged in time series.

9. In the toy sot according to claim 1, wherein the filter function detects the code by detecting the plurality of distinct signal frequency sounds sequentially and individually.

10. A non-transitory processor-readable storage medium having stored thereon a program product for use with an interactive toy in which a toy set of the interactive toy and the program product is configured to operate in cooperation with a game device equipped with a sound input means, a sound output means and a display means, and configured to execute a game or a play based on a program installed from the program product, wherein said storage medium is one of (a) a storage means having an interface means and configured to supply the program product through the interface means when mounted to the game device and (b) a storage means placed at a remote site and configured such that the program product can be downloaded to the game device through a network,
said program product comprising a plurality of individual programs and data which generates an image and a sound related to the interactive toy, and a control program configured to impart to the game device the following functions:
a filter function configured to detect a control code formed of a sequence of a plurality of distinct single frequency sounds inputted into the sound input means sent from the interactive toy, the sequence of the plurality of distinct single frequency sounds having frequencies different from one another arranged in a tune series;
a program-selection function to read out one of said plurality of individual programs correspondingly to said code detected by the filter function, and execute the read-out individual program so that the game device outputs at least either of an image and a sound related to the interactive toy;
a control-code generating function configured to generate a control code formed of a sequence of single frequency sounds including frequencies different from one another;
a sound generating function configured to arrange the sequence of single frequency sounds generated by the control-code generating function sequentially in a time series; and
a sound-outputting function configured to send out to the interactive toy the sequence of single frequency sounds from the sound output means of the game device, such that the sending out of the sequence of single frequency sounds is performed by superposing such respective single frequency sounds on a game sound which is outputted in cooperation with an image displayed on the display screen of the display means or by sending such sequence of single frequency sounds immediately before the game sound is outputted,
wherein a mutual interactive communication between the game device and the interactive toy is enabled without making any additional change to a hardware configuration of the game device.

11. A non-transitory processor-readable storage medium according to claim 10, wherein the storage medium is a storage means having the interface means configured to comply with a connecting specification installed on the game device, so that the storage medium is mountable to the game device and having stored thereon a plurality of individual programs and data, which generates an image and a sound, and the control program executable by a control means of the game device.

12. A program product as set forth in claim 10, wherein one of the individual programs is configured to cause the game device to output a voice message correspondingly to a sound outputted from the interactive toy.

13. A program product as set forth in claim 10, wherein one of the individual programs read from the program product is configured to cause the game device to display a message on the display screen of the display means correspondingly to the received control code and in synchronism with a timing of outputting of the sound from the game device.

14. A transmission/reception system between an electronic toy and an electronic device each equipped with a sound output means configured to output a sound of a voice frequency band and a sound input means configured to detect a sound of a voice frequency band, each of the electronic toy and the electronic device comprising a storage means storing a plurality of individual programs and a control program, the control program being configured to impart to the electronic toy or the electronic device on which the control program is installed the following functions:
a filter function configured to detect a control code formed of a sequence of a plurality of distinct single frequency sounds inputted into the sound input means sent from the other of the electronic toy or the electronic device, the sequence of the plurality of distinct single frequency sounds having frequencies different from one another arranged in a time series;
a program-selection function to read out one of said plurality of individual programs correspondingly to said code detected by the filter function so that the electronic toy or the electronic device executes the selected individual program;
a control-code generating function configured to generate a control code formed of a sequence of single frequency sounds including frequencies different from one another;

a sound generating function configured to arrange the sequence of single frequency sounds generated by the control-code generating function sequentially in a time series; and a sound-outputting function configured to send out to the other of the electronic toy or the electronic device the sequence of single frequency sounds from the sound output means.

15. A transmission/reception system according to claim 14, wherein in one of the electronic devices single frequency sounds configuring the control codes are selected individually from a frequency band of 2000 to 3000 Hz, and wherein in the other of the electronic devices single frequency sounds configuring the control codes are selected individually from a frequency band of 7000 to 9000 Hz.

16. A transmission/reception system according to claim 14, wherein singe frequency sounds for generating the control code are selected from a group consisting of a first frequency sound selected from 3000 to 2900 Hz, a second frequency sound selected from 2800 to 2700 Hz, a third frequency sound selected from 2700 to 2600 Hz, a fourth frequency sound selected from 2500 to 2400 Hz, and a fifth frequency sound selected from 2400 to 2300 Hz, and the control code is made up of a combination of plural single frequency sounds selected out of the first to the fifth single frequency sounds.

* * * * *